United States Patent
Mizuo

(10) Patent No.: US 9,998,724 B2
(45) Date of Patent: Jun. 12, 2018

(54) IMAGE PROCESSING APPARATUS AND METHOD FOR PROCESSING THREE-DIMENSIONAL DATA THAT DESCRIBES A SPACE THAT INCLUDES PHYSICAL OBJECTS

(71) Applicant: CANON KABUSHIKI KAISHA, Tokyo (JP)

(72) Inventor: Yoshihiro Mizuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 14/963,887

(22) Filed: Dec. 9, 2015

(65) Prior Publication Data

US 2016/0171749 A1 Jun. 16, 2016

(30) Foreign Application Priority Data

Dec. 15, 2014 (JP) .................................. 2014-253414
Sep. 24, 2015 (JP) .................................. 2015-187438

(51) Int. Cl.
*G06K 9/00* (2006.01)
*H04N 13/00* (2018.01)
*H04N 19/597* (2014.01)

(52) U.S. Cl.
CPC ....... *H04N 13/0022* (2013.01); *H04N 19/597* (2014.11); *G06K 2209/40* (2013.01); *H04N 2013/0081* (2013.01)

(58) Field of Classification Search
CPC .......... H04N 13/004; H04N 2013/0081; G06T 19/20; G06K 9/00013
See application file for complete search history.

(56) References Cited

U.S. PATENT DOCUMENTS

| | | | |
|---|---|---|---|
| 6,549,650 B1 * | 4/2003 | Ishikawa ............ | G02B 27/2264 345/419 |
| 2002/0029094 A1 * | 3/2002 | Koreishi ............. | B29C 67/0077 700/197 |
| 2012/0069009 A1 * | 3/2012 | Shimoyama ......... | H04N 13/026 345/419 |
| 2012/0229450 A1 * | 9/2012 | Kim .................... | G06F 3/04815 345/419 |

FOREIGN PATENT DOCUMENTS

JP 2004-037396 A 2/2004

* cited by examiner

*Primary Examiner* — Eueng-Nan Yeh
(74) *Attorney, Agent, or Firm* — Cowan, Liebowitz & Latman, P.C.

(57) ABSTRACT

An image processing apparatus comprises: an obtaining unit configured to obtain three-dimensional data that describes a space that includes a physical object; a converting unit configured to convert, for data of positions in a predetermined direction of the three-dimensional data, each position in accordance with a position at which a physical object is present; and an output unit configured to output three-dimensional data for which the positions in the predetermined direction have been converted.

18 Claims, 16 Drawing Sheets

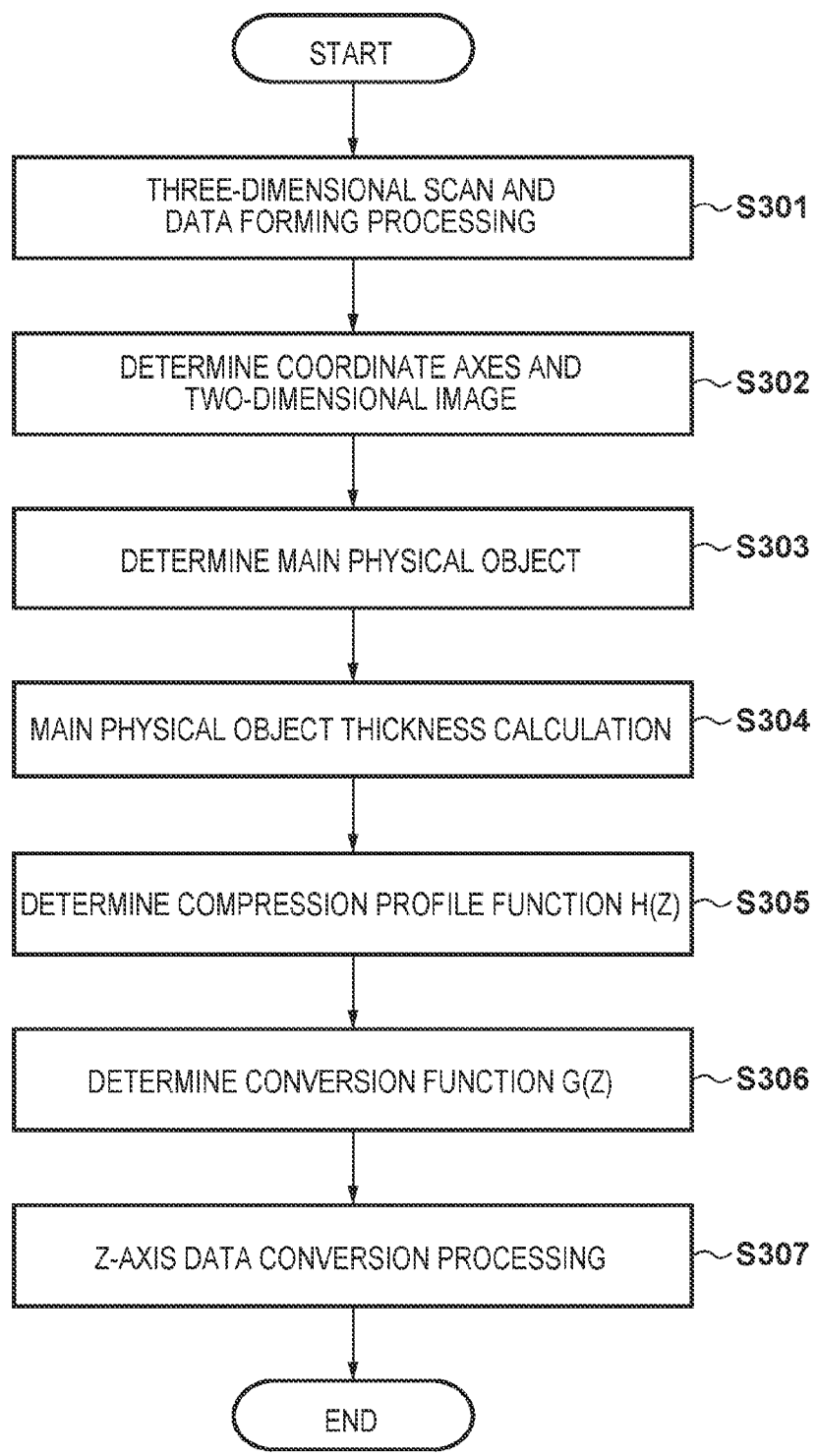

FIG. 6

STL FILE FORMAT SYNTAX

SOLID OPTIONAL STRING

FACET NORMAL x-COMPONENT-VALUE y-COMPONENT-VALUE z-COMPONENT-VALUE  ⎫ REPRESENTS NORMAL VECTOR OF TRIANGLE
OUTER LOOP
VERTEX x-COMPONENT-VALUE y-COMPONENT-VALUE z-COMPONENT-VALUE  ⎫
VERTEX x-COMPONENT-VALUE y-COMPONENT-VALUE z-COMPONENT-VALUE  ⎬ REPRESENTS EACH VERTEX OF A TRIANGLE VERTEX
VERTEX x-COMPONENT-VALUE y-COMPONENT-VALUE z-COMPONENT-VALUE  ⎭
ENDLOOP
ENDFACET
⎫ FIRST TRIANGLE DATA

FACET NORMAL x-COMPONENT-VALUE y-COMPONENT-VALUE z-COMPONENT-VALUE
OUTER LOOP
VERTEX x-COMPONENT-VALUE y-COMPONENT-VALUE z-COMPONENT-VALUE
VERTEX x-COMPONENT-VALUE y-COMPONENT-VALUE z-COMPONENT-VALUE
VERTEX x-COMPONENT-VALUE y-COMPONENT-VALUE z-COMPONENT-VALUE
ENDLOOP
ENDFACET
⎫ SECOND TRIANGLE DATA

...

(REPEAT FROM THE FACET NORMAL LINE TO THE ENDFACET LINE FOR EACH TRIANGLE DATA ITEM)

ENDSOLID OPTIONAL STRING

FIG. 11A
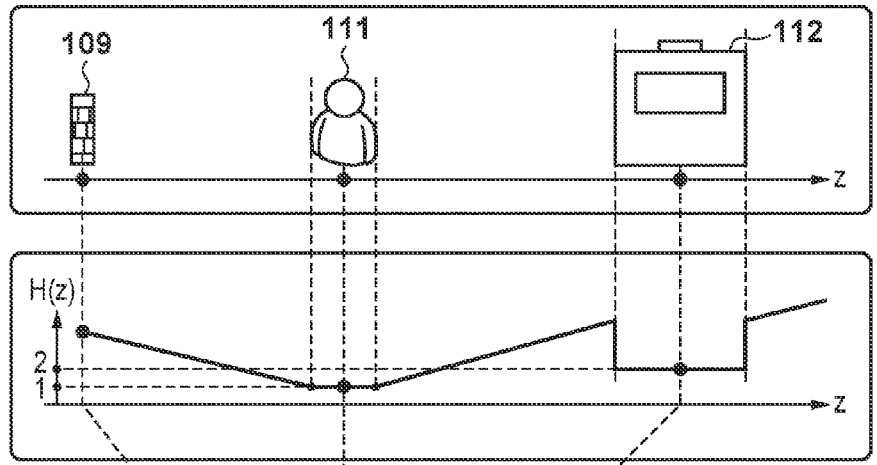
FIG. 11B
FIG. 11C
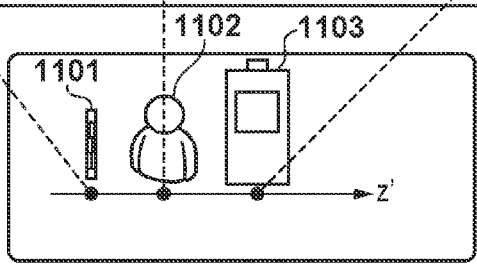
FIG. 11D
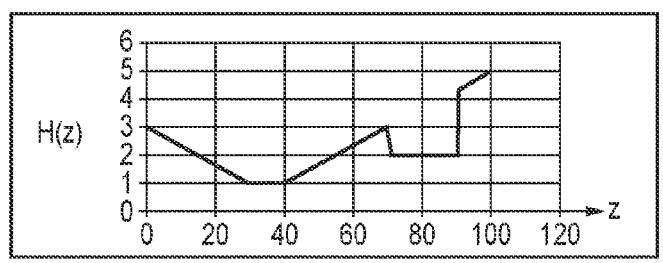
FIG. 11E
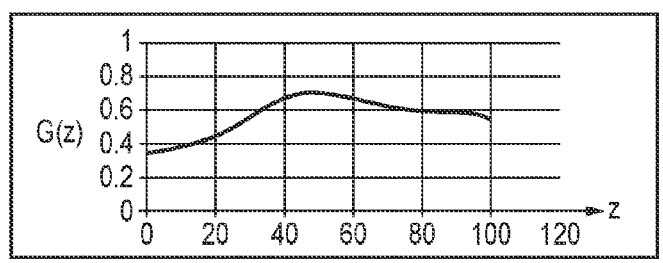
FIG. 11F
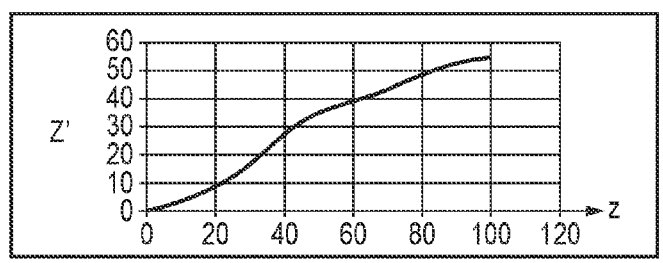

F I G. 13A
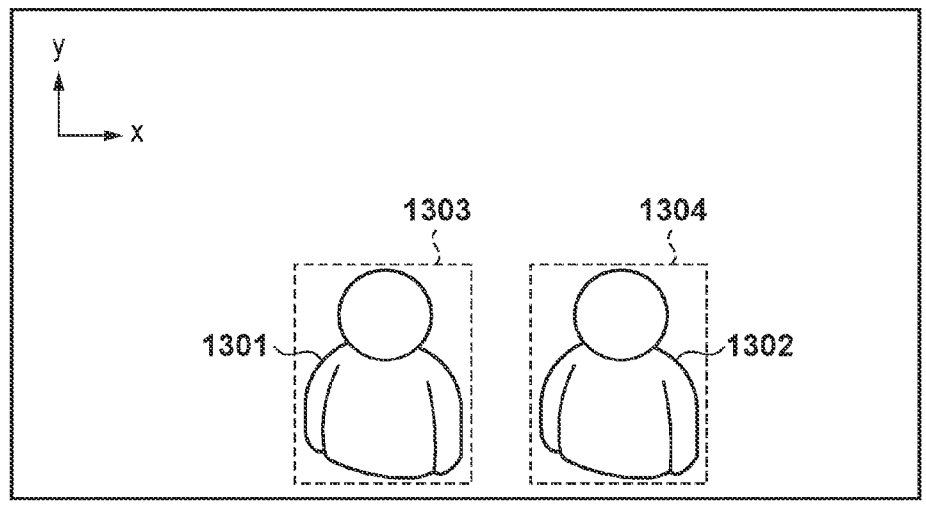
F I G. 13B
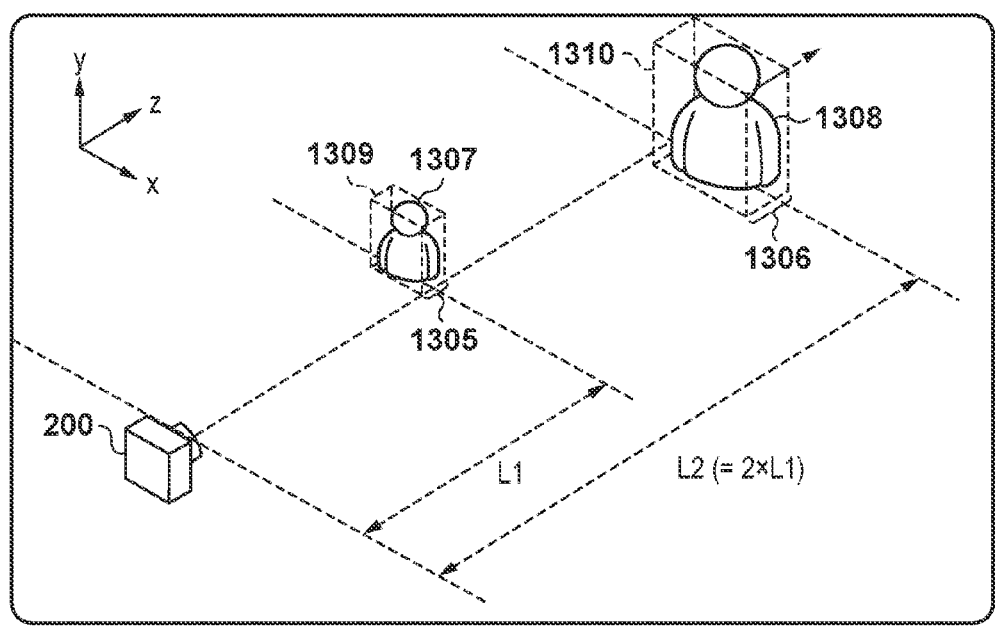

FIG. 14A
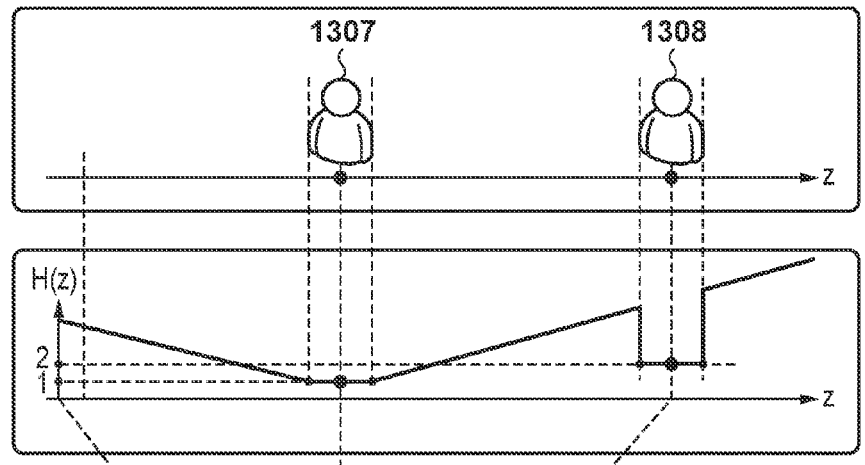
FIG. 14B
FIG. 14C
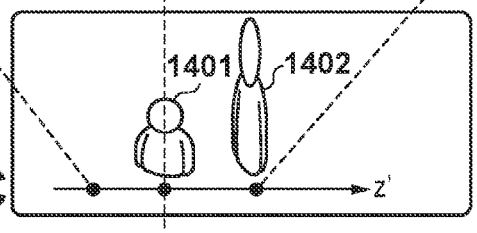
FIG. 14D
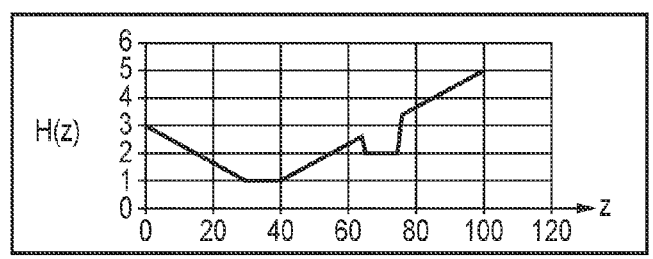
FIG. 14E
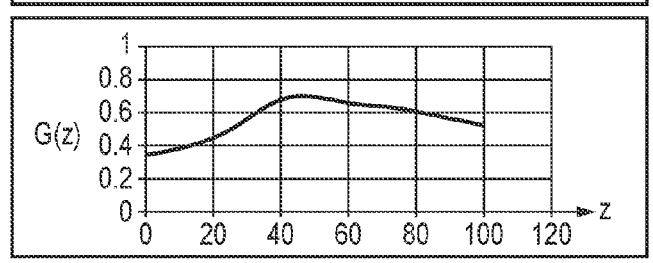
FIG. 14F
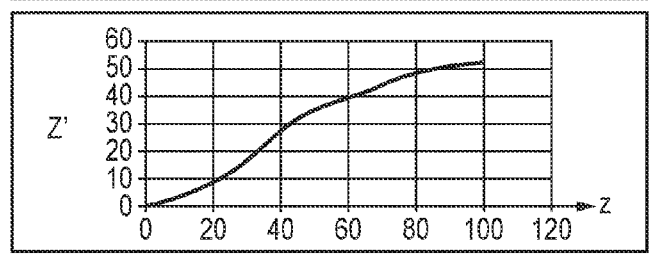

IMAGE PROCESSING APPARATUS AND METHOD FOR PROCESSING THREE-DIMENSIONAL DATA THAT DESCRIBES A SPACE THAT INCLUDES PHYSICAL OBJECTS

BACKGROUND OF THE INVENTION

Field of the Invention

The present invention relates to an image processing apparatus, a method of controlling the same, and a storage medium, and in particular it relates to a technique of converting three-dimensional data.

Description of the Related Art

Conventionally, a method of measuring a distance corresponding to each pixel area of a captured image and obtaining three-dimensional data is known. Japanese Patent Laid-Open No. 2004-037396 discloses a method of combining a measurement of a distance by laser with a captured image and effectively obtaining three-dimensional data.

In recent years, a technique called 3-D printing or the like that, when three-dimensional data of a physical object is input, can output a three-dimensional shape of the physical object as a formed object is spreading. If output of a formed object of a three-dimensional shape becomes easy and spreads to family homes or the like, it can be considered that, for particular types of three-dimensional shape data, an output physical object that does not meet one's needs will be produced by using the shape of the original data as is, and only changing a reduction or an enlargement.

SUMMARY OF THE INVENTION

The present invention has been made in consideration of the aforementioned problem, and realizes a technique that can deform three-dimensional shape data for causing a formed object to be output by using a reduction or an enlargement suitable to the formed object.

In order to solve the aforementioned problems, the present invention provides an image processing apparatus comprising: an obtaining unit configured to obtain three-dimensional data that describes a space that includes a physical object; a converting unit configured to convert, for data of positions in a predetermined direction of the three-dimensional data, each position in accordance with a position at which a physical object is present; and an output unit configured to output three-dimensional data for which the positions in the predetermined direction have been converted.

In order to solve the aforementioned problems, the present invention provides a method of controlling an image processing apparatus comprising: obtaining three-dimensional data that describes a space that includes a physical object; converting, for data of positions in a predetermined direction of the three-dimensional data, each position in accordance with a position at which a physical object is present; and outputting three-dimensional data for which the positions in the predetermined direction have been converted.

In order to solve the aforementioned problems, the present invention provides a non-transitory computer-readable storage medium storing a program for causing a computer to execute the method of controlling an image processing apparatus comprising: obtaining three-dimensional data that describes a space that includes a physical object; converting, for data of positions in a predetermined direction of the three-dimensional data, each position in accordance with a position at which a physical object is present; and outputting three-dimensional data for which the positions in the predetermined direction have been converted.

According to the present invention, it is possible to deform three-dimensional shape data for causing a formed object to be output by using a reduction or an enlargement suitable to the formed object.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart that illustrates a series of operations of conversion processing of three-dimensional data according to the first embodiment.

FIG. 6 is an example of a data format of three-dimensional data according to the first embodiment.

FIGS. 11A to 11F are views for explaining compression of a depth direction of three-dimensional data according to the second embodiment.

FIGS. 13A and 13B are views for explaining processing for detecting a range of a main physical object according to the third embodiment.

FIGS. 14A to 14F are views for explaining compression of a depth direction of three-dimensional data according to the third embodiment.

DESCRIPTION OF THE EMBODIMENTS

First Embodiment

Exemplary embodiments of the present invention will be described hereinafter in detail, with reference to the drawings. Note that below, as one example of an image processing apparatus, explanation is given of an example of a digital camera, comprising a configuration that can measure (also called three-dimensional scanning) a three-dimensional shape of a subject, to which the present invention is applied. However, the image processing apparatus according to the present invention is not limited to a configuration that can measure the three-dimensional shape of a subject, and is also applicable to electronic devices that can obtain measured three-dimensional shape data. These electronic devices may include mobile telephones, game devices, tablet terminals, personal computers, clock-type or glasses-type information terminals, or the like, for example.

(Configuration of Digital Camera 200)

Figure 2:
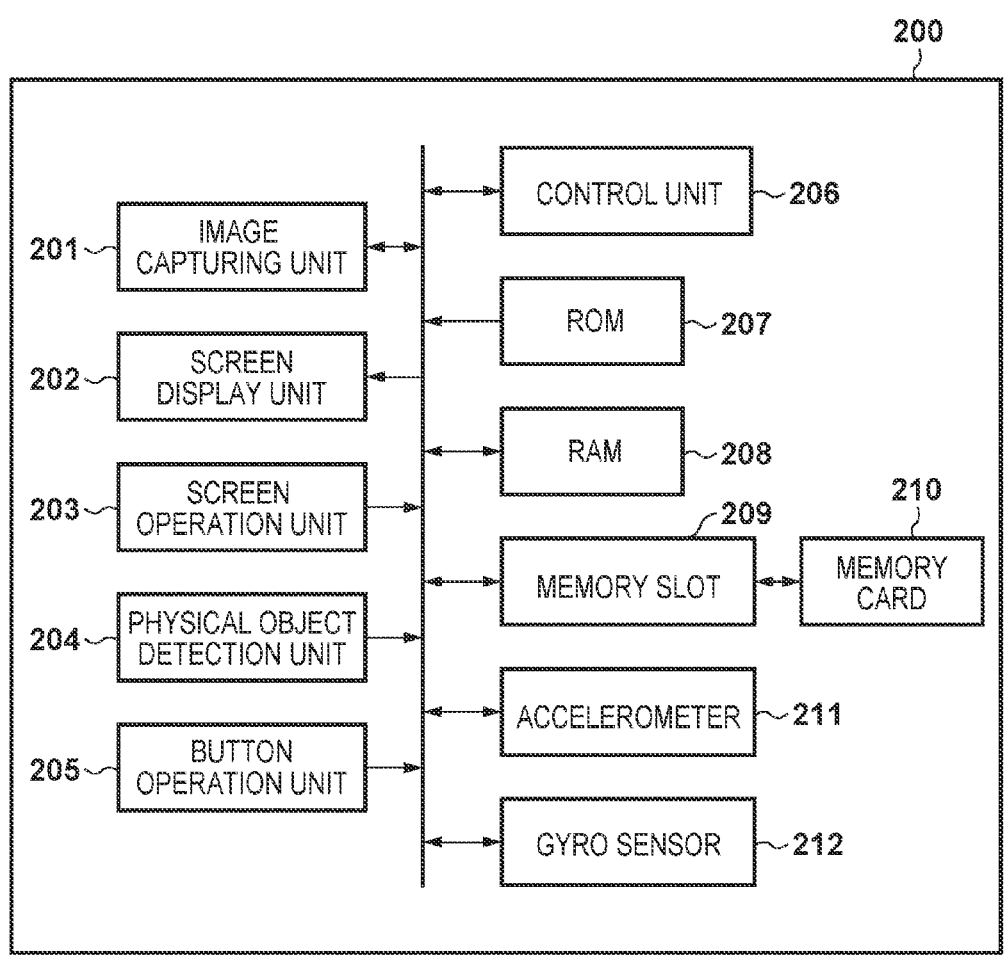
FIG. 2 is a block diagram for illustrating an example of a functional configuration of a digital camera 200 as an example of an image processing apparatus according to a first embodiment.

FIG. 2 is a block diagram for illustrating an example of a functional configuration of a digital camera 200 as an example of an image processing apparatus according to the present embodiment. Note that one or more functional blocks illustrated in FIG. 2 may be realized by hardware such as an ASIC or a programmable logic array (PLA), or may be realized by a programmable processor such as a CPU or an MPU executing software. Also, these may be realized by a combination of software and hardware. Accordingly, in the following explanation, even in a case where different functional blocks are recited as the subject of operations, it is possible that they are realized by the same hardware as the subject.

An image capturing unit 201 is comprised by a plurality of imaging optical systems and an image sensor, and outputs a parallax image obtained by the respective imaging optical systems and the image sensor. The image sensor, which is provided inside the image capturing unit 201, receives an optical image of an object formed by one imaging optical system by a plurality of photoelectric conversion elements that comprise a plurality of pixels arranged two-dimensionally, performs photoelectric conversion and outputs an analog signal for each pixel. The image sensor may be a CMOS (Complementary Metal Oxide Semiconductor) image sensor. The image sensor outputs the analog signal for each pixel in accordance with a timing signal supplied by a timing generator. Each analog signal of an image output from each of the image sensors is respectively A/D converted and output as digital image data (parallax image data) that has parallax. A control unit 206 uses the parallax image data output from the image capturing unit 201 to obtain parallax information, and calculates, based on the parallax information, three-dimensional shape data (hereinafter, simply three-dimensional data) of a physical object that is the subject. Note that configuration may such that by one image sensor, each pixel of the entirety of effective pixels, for example, is configured by an independent plurality of photodiodes, and the pixels are caused to receive respective light flux of a plurality of different imaging optical system pupil regions. The pieces of image data corresponding to the light flux of different pupil regions are pieces of image data that have parallax with respect to each other, and similarly to the above described parallax image data, it is possible to obtain depth direction data from a pair of image signals corresponding to the different pupil regions. If configuration is performed in this way, it is possible to use one imaging optical system to obtain the parallax image data.

In addition to displaying an image output from the image capturing unit 201 while obtaining three-dimensional data, a screen display unit 202 performs a confirmation of information relating to already obtained shape data (already scanned information), a captured image, or the like.

A screen operation unit 203 is, for example, arranged on a display surface of the screen display unit 202, and notifies detection of an operation instruction to the control unit 206 when, for example, a contact operation or the like by a user is detected. The control unit 206 controls the screen display unit 202 to, for example, change a display of a menu display or the like in accordance with the notification from the screen operation unit 203.

A physical object detection unit 204 performs later-described physical object detection processing with respect to the image data obtained by the image capturing unit 201. In the physical object detection processing, detection of a person or a physical object in an image, and calculation processing to specify a position, size, of these is performed, and a calculation result is output to the control unit 206.

A button operation unit 205 detects an operation instruction from a user with respect to an operation button or the like, and notifies detection of the operation instruction or detection content thereof to the control unit 206. The control unit 206 controls each unit of the digital camera 200 in accordance with the notification from the button operation unit 205.

The control unit 206 is, for example, a CPU or an MPU, and performs control of the digital camera 200 overall by loading a program stored in a ROM 207 to a work area of a RAM 208 and executing it. The control unit 206 calculates three-dimensional data based on the parallax information obtained from the parallax image data, and also performs later-described three-dimensional data conversion processing to the calculated three-dimensional data.

The ROM 207 is a non-volatile storage apparatus comprised from a semiconductor memory, a magnetic disk, or the like, and stores programs that the control unit 206 executes or setting values set in the digital camera 200.

The RAM 208 is a volatile storage apparatus that stores temporary data for which may disappear after a power supply of the digital camera 200 is cut. The RAM 208 handles a role of storing temporary data during processing.

A memory slot 209 is an interface for reading/writing recorded data from/to a memory card 210. The memory card 210 is a magnetic, semiconductor, or the like, configured recording medium, and captured images, three-dimensional data, or setting values for the digital camera 200 are recorded via the memory slot 209.

An accelerometer 211 and a gyro sensor 212 detect movement and rotation, respectively, of the digital camera 200 itself. The control unit 206 can generate three-dimensional physical object data by combining information of a detected movement amount or rotation amount, and physical object shape information (i.e., three-dimensional information obtained from the parallax image data) of one direction that can be calculated from the output of the image capturing unit 201 with information obtained by many viewpoints. Note that, in the present embodiment, to obtain depth direction (a z-axis direction) information, the parallax image data is used, but limitation is not made to this, and for example obtaining the depth direction information such as a ToF sensor that uses infrared radiation or the like may be of another method.

Each functional block of the image capturing unit 201 to the gyro sensor 212 is connected to each other by a bus, and it is possible to perform transmission and reception of data between each block.

(Necessity of Three-Dimensional Data Conversion Processing According to the Present Embodiment)

Figure 1A:
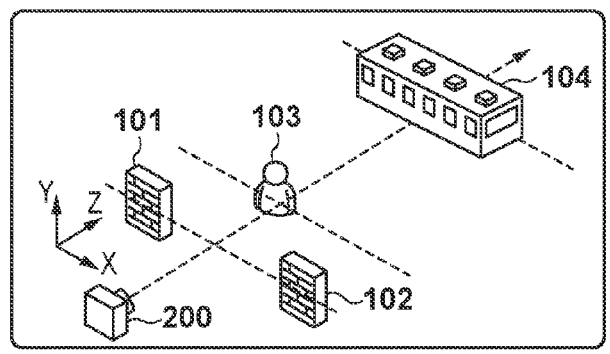
FIGS. 1A to 1D are views for explaining a problem to which conversion processing of three-dimensional data according to the present invention is to be applied.

With reference to FIG. 1A to FIG. 1D, explanation is given of an example of a problem when three-dimensional data obtained by a three-dimensional scan of a space comprised by a subject is output as a formed object. FIG. 1A illustrates a positional relationship of the digital camera 200 and real physical objects of physical objects 101-104 that are subjects. The physical objects 101-104 are present at respective positions in a depth direction (a z-axis direction) from the digital camera 200, and each has a depth (a thickness) specific to the physical object. The physical object 101 and the physical object 102 are positioned separated from the Z-axis by a predetermined distance in a positive x direction and a negative x direction respectively, and are positioned at the same distance from the digital camera 200 in the z-axis direction. Further from the physical object 101 and the physical object 102 (in a positive z-axis direction), the physical object 103 and the physical object 104 are separated and respectively positioned at predetermined distances. Three-dimensional data of such physical objects 101-104 is three-dimensionally scanned by the digital camera 200. Here, explanation is given for three-dimensional data generated by a configuration that obtains two-dimensional data of an X-axis direction and a Y-axis direction by an image signal obtained by an image sensor comprising photoelectric conversion elements arranged in two-dimensions and additionally obtaining depth information, as in the present embodiment. For example, if capturing by an image sensor that comprises the image capturing unit 201, a size of a subject in a captured image is captured smaller than its actual size in accordance with its distance from the digital camera 200. Accordingly, even if three-dimensional data is generated by simply adding z-axis direction data for depth information to two-dimensional data (image data) obtained from the image capturing unit 201, there is no limitation to reproducing a relationship of the size for each subject in real space. To model the three-dimensional data in real space, it is necessary to transform the size of each subject in the X and Y directions based on the depth information. However, in the present embodiment, it is envisioned that a user, who has data that can be viewed as two-dimensional image data, requests the image to be transformed into three dimensions and that formed object is output. Accordingly, as three-dimensional data to be provided to a 3D output apparatus, there is no necessity for the three-dimensional data to reproduce the relation between the sizes of each subject, and, on the contrary, cases in which the former three-dimensional data in which the relation of sizes of physical objects (subjects) in the X and Y axis directions is the same as in the image data is preferred can be considered. Accordingly, in the present embodiment, as three-dimensional data that describes a space that includes physical objects, the data of the X and Y directions is considered as being both types of data.

Figure 1B:
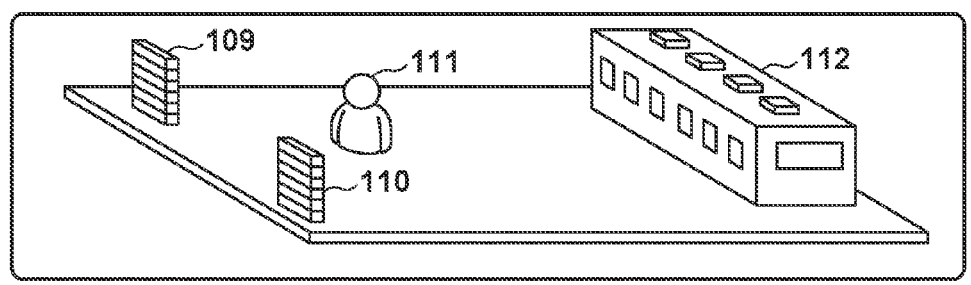

Regarding the three-dimensional data obtained by the above described three-dimensional scan, further consideration is given to the depth direction information. For example, as illustrated in FIG. 1B, for the depth information of the obtained three-dimensional data, a reduction is changed (normalized) to give a size that can be output by the 3D output apparatus. Objects 109-112 in the three-dimensional data respectively correspond to the physical objects 101-104. Each object illustrated in FIG. 1B is uniformly reduced in the z-axis direction in accordance with a range of the 3D output apparatus, and reduced while maintaining a positional relationship in the depth direction between the physical objects 101-104.

Figure 1C:
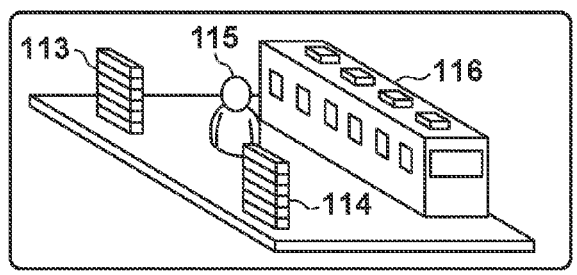
Figure 1D:
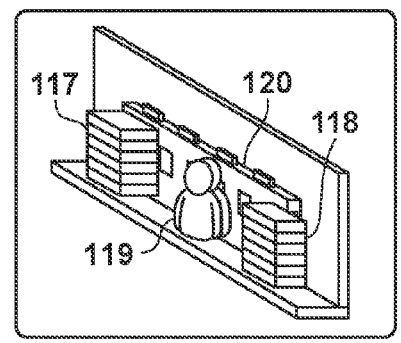

However, if outputting captured three-dimensional data as a memento physical object or the like, there is are needs such as to cause the reduction in the depth direction to be appropriately shrunk in accordance with features of physical objects, as in FIG. 1C for example, or to cause output as a relief-shaped 3D output physical object, as in FIG. 1D. In output of three-dimensional shape data of a type as illustrated in FIG. 1B, there are cases in which a space between the object 111 and the object 112 is wasteful, and cases in which a configuration is not in line with a user's desire such as when an important subject, for example the object 111, or the like, that is present in the image data is not emphasized, does not appear to be impressive, or the like. Accordingly, instead of accurately reproducing the depth and positional relationship of each physical object, performance of three-dimensional data conversion processing that changes the depths between objects as necessary is desired.

Accordingly, in the present embodiment, it is possible to change a reduction of data of a position in a predetermined direction, such as a z-axis direction, for example, and additionally change the reduction (a compression rate) in accordance with the position (a range) in a z-axis direction. In other words, in the present embodiment, data of positions in a predetermined direction for three-dimensional data is respectively converted in accordance with positions at which physical objects are present. For example, as illustrated in FIG. 1C and FIG. 1D, a reduction of a depth portion between the object 111 and the object 112 may be larger than a reduction of a range of the object 111 or the object 112. In other words, in the present embodiment, by three-dimensional data conversion processing to be explained below, for example the reduction in the depth direction is changed according to position in the depth direction. The reduction in the z-axis direction may be performed independently from a reduction in the x-axis direction or the y-axis direction, which are orthogonal to the z-axis direction, or may be performed in association in some way.

(Series of Operations Corresponding to Three-Dimensional Data Conversion Processing)

Next, with reference to FIG. 3, explanation is given of a series of operations corresponding to three-dimensional data conversion processing by the digital camera 200. This processing is started when, for example, an image capturing instruction by a user to the button operation unit 205 of the digital camera 200 is detected. Note that each step according to this processing is executed in accordance with an instruction of the control unit 206, and is realized by the control unit 206 loading a program stored in the ROM 207 into the work area of the RAM 208 and executing the program.

In step S301, the control unit 206 performs a three-dimensional scan that obtains the parallax image data output from the image capturing unit 201, an output of the accelerometer 211, and an output of the gyro sensor 212, and three-dimensional data forming processing based on each piece of obtained data. In the present embodiment, explanation is given of an example of a case in which the physical objects 101-104 that are the subjects illustrated in FIG. 1A are targets of the three-dimensional scan. In the present embodiment, scanning is performed from multiple directions with an image of a position and direction (for example, the digital camera 200 of FIG. 1A) as a reference, in other words, capturing from a plurality of directions is performed a plurality of times. When capturing, change in a direction or an image capturing position of the digital camera 200 is obtained in association with each capturing, and three-dimensional shapes of the subjects are obtained from the obtained data. Based on a plurality of pieces of parallax image data and changes in the image capturing position or direction, it is possible to use a publicly known method as a method of obtaining the three-dimensional shapes of physical objects that are the subjects. For example, because it is possible to grasp a positional relationship of a plurality of positions at which capturing was performed by using the information of the accelerometer 211 and the gyro sensor 212, it is possible to put point cloud data, which is all the three-dimensional data, onto positions in a single three-dimensional space. In accordance with this composition operation, it is possible to obtain 3D point cloud data of surface shapes that includes the front and back of the subjects. After scanning the three-dimensional shapes of the physical objects illustrated in FIG. 1A, the control unit 206 performs processing to form the three-dimensional data—in other words, for example, performs processing to form generic three-dimensional data of an STL file format or the like.

In the STL file format, a method that represents a three-dimensional shape as a collection of triangle surfaces is used, and it is necessary to convert three-dimensional point cloud data into triangle collection data. Regarding this conversion, several methods are commonly known; in the present embodiment a three-dimensional Delaunay division method, which is a widely known algorithm, is used. This Delaunay division method algorithm is stored in advance in the ROM 207; point cloud data of a physical object obtained by the previously described procedure is converted into a triangle plane collection, and then converted into the STL file format, which is triangle collection data in the three-dimensional space.

In the present embodiment, explanation is given, of changing, by the forming processing of these steps, the reduction to a size that the 3D output apparatus is capable of, and generating three-dimensional data in which each of the x, y and z axes are reduced by the same reduction. When the processing to form the data terminates, the control unit 206 stores the formed data in the memory card 210 via the memory slot 209. In the present embodiment explanation is given of a three-dimensional scan that uses a plurality of imaging optical systems and parallax image data thereof, but as long as three-dimensional data is obtained, it is possible to apply another configuration, such as a configuration that uses laser irradiation or a configuration that uses an imaging plane phase difference sensor. If an imaging plane phase-difference detection mechanism is installed in the image capturing unit 201, it is possible to obtain distance data at units of pixels. Accordingly, in image data obtained by performing image capturing processing from a particular position, it is possible to obtain color data for each pixel in the image as well as, for each pixel, information of distance from the digital camera 200 to a surface portion of a subject corresponding to the respective pixel. This is raw three-dimensional data for which point cloud data that arranges the depth direction distance for each pixel can be obtained.

In step S302, the control unit 206 determines coordinate axes to define the depth direction. In the present embodiment, for example a z direction is defined as the depth direction. A y direction represents a vertical direction with respect to the ground, and it is defined by specifying a direction of acceleration due to gravity in accordance by the accelerometer 211 during a three-dimensional scan. Because the digital camera itself faces various directions during the three-dimensional scan, it is not determined immediately after the scan which direction is the z-axis direction. For this reason, the control unit 206 displays an approximate form of the three-dimensional data, which is the result of the scan, on the screen display unit 202, and the z-axis direction that is the depth direction is determined by a user via a user interface of the screen operation unit 203. Upon determining the z-axis direction, the y-axis direction is determined in accordance with the above described definition of the y-axis, and additionally a x-axis direction is determined. The control unit 206 converts the three-dimensional data generated in step S301 to three-dimensional data of the newly determined coordinate system, and causes it to be stored in the memory card 210. Note that, in the following explanation, explanation is given in which the z-axis shown in FIG. 1A is selected.

From two-dimensional captured images stored during the three-dimensional scan, an image corresponding to a predetermined cross-section of the three-dimensional data is determined. In other words, one image, which is an image captured facing the determined z-axis direction, is determined to be an image in which the above described physical objects 101-104 are contained within the angle of view thereof, and the image is stored in the memory card 210 as additional information for the three-dimensional data.

In the present embodiment, because scanning (i.e. capturing) from multiple directions is assumed, configuration is taken so that the setting of the z-axis direction is performed by a user. However, in the case of a scanning method that does not obtain back surface information due to scanning from only one direction, configuration may be taken so as to set the direction at the time of scanning as the z-axis unchanged. In such a case, designating the z-axis in accordance with a user is unnecessary.

Figure 4A:
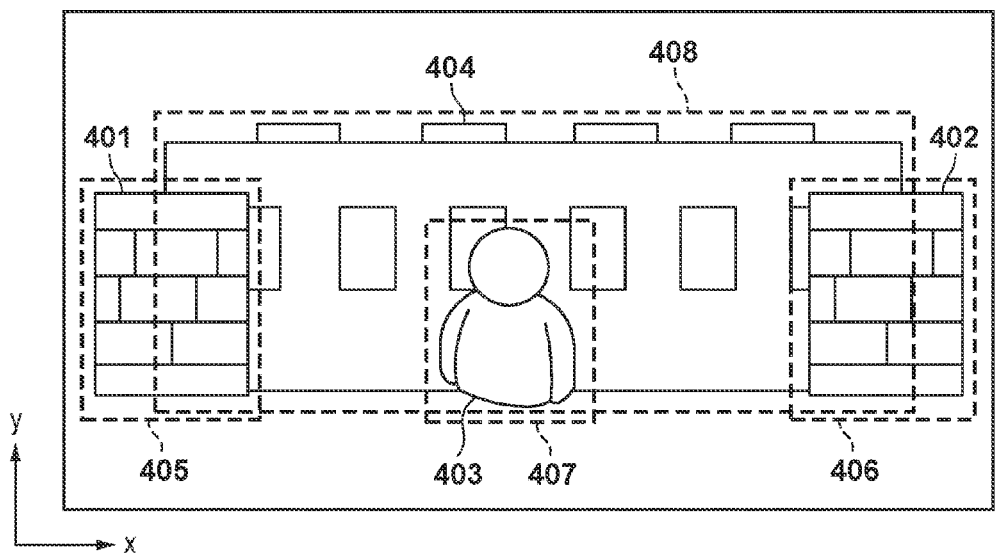
FIGS. 4A and 4B are views for explaining processing for detecting a range of a main physical object according to the first embodiment.

In step S303, from the physical objects that are the subjects, the control unit 206 determines a main physical object that is of interest. FIG. 4A illustrates an example of a two-dimensional image determined in step S302 and a result of detection of physical objects with respect to the image. In response to an instruction from the control unit 206, the physical object detection unit 204 detects, in the two-dimensional image, a physical object in the image, and subsequently the control unit 206 displays the result of detection by the physical object detection unit 204 on the screen display unit 202. Note that, in detection of the physical objects in the two-dimensional image, because it is possible to use a publicly known object detection technique, a detailed explanation of the object detection technique is omitted. In the example of displaying in FIG. 4A, with respect to four physical objects detected in the image, i.e. the physical objects 401-404, physical object detection frames 405-408 are displayed to clearly show that each physical object has been detected. In accordance with an instruction operation with respect to the screen operation unit 203, a user specifies the main physical object by selecting one of the physical object detection frames 405-408. When a particular physical object is specified by a user operation, the control unit 206 determines the specified physical object as the main physical object. Note that, regarding a method of determining the main physical object, in addition to the above described method of determining manually by the user, configuration may be taken so as the control unit 206 automatically determines the main physical object. In such a case, configuration may be taken to determine based on information such as a characteristic of the physical object such as a position of the physical object in the angle of view, whether the physical object is a person, or the like.

Figure 4B:
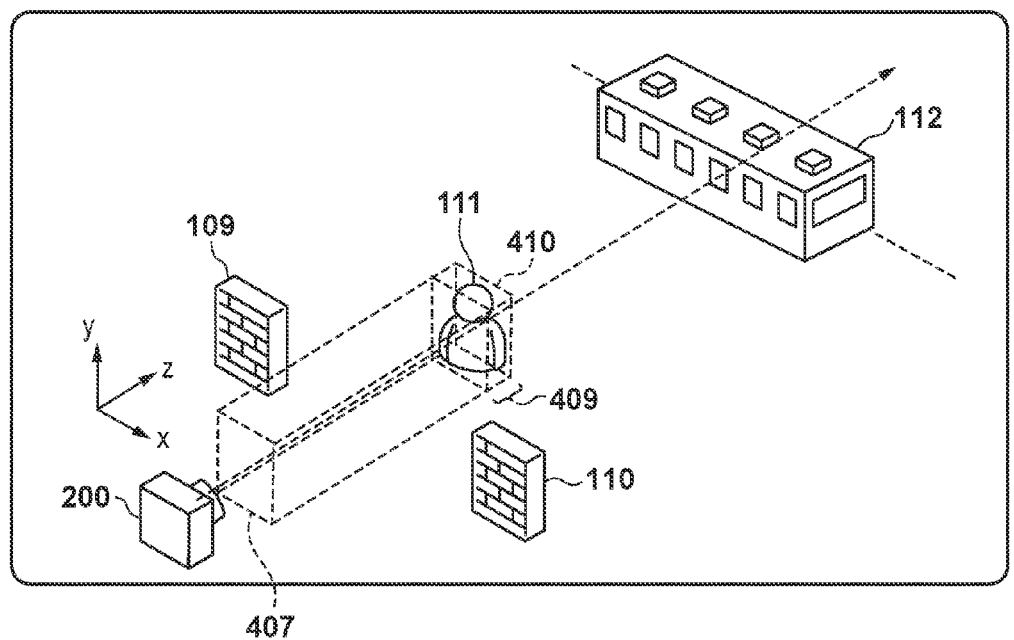

In step S304, the control unit 206 detects a thickness in the depth direction of the determined main physical object. It is possible to obtain the position and orientation at which the image illustrated in FIG. 4A was captured from a position relation recorded during the three-dimensional scan, and these are assumed to be the position and orientation of the optical axis of the digital camera 200 illustrated in FIG. 4B. The control unit 206 can identify what relation the physical object detection frame 407 of FIG. 4A takes in the already obtained three-dimensional data. Specifically, FIG. 4B illustrates at what position the physical object detection frame 407 lies in the three-dimensional data. The control unit 206 scans the physical object detection frame 407 in the z-axis direction, and detects the three-dimensional data of a physical object region included in a rectangular parallelepiped 410 formed by the scanning.

More specifically, for example in the case of the STL file format or the like, the three-dimensional data is expressed as a collection of three-dimensional triangle information items, which are the smallest units of what is referred to as polygons. The control unit 206 first detects all polygons included in the above-described rectangular parallelepiped. Moreover, with consideration to a connection state between detected polygons, it is determined whether a polygon group comprises a closed surface in the above described rectangular parallelepiped 410, and whether a mapping to an xy plane of a range comprised by the closed surface occupies a ratio of the physical object detection frame 407 that is greater than or equal to a fixed amount. If both determinations are satisfied, the control unit 206 determines the three-dimensional data included in the rectangular parallelepiped 410 to be the physical object region of the main physical object. However, in the case that the above-described conditions are satisfied, if a plurality of physical objects comprised by polygon closed surfaces are detected, for example three-dimensional data regarding one physical object is determined by adding a condition such as "further in front of" or the like. In the case of the present embodiment, by performing such processing, it is possible to extract polygon information that configures the physical object 103. From the detected polygon information that comprises the physical object 103, a difference between a part for which a z-axis component is smallest and a part for which the z-axis component is largest is used to calculate the thickness of the physical object 103 by estimation. The calculated thickness is a physical object thickness 409 in FIG. 4B.

In step S305, the control unit 206 generates a compression profile function H(z) with respect to the z-axis direction, based on the thickness and the position in the z-axis direction of the physical object 103 calculated in step S304. Specifically, the compression profile function H(z) is a function of z that indicates to what scaling factor a component at a position on the z-axis is compressed by, and represents a conversion characteristic with respect to the z direction. The compression profile function H(z) is generated by using the thickness and the position in the z-axis direction of the object 111 that are calculated in step S304. With reference to FIGS. 5A to 5F, explanation is given for z-axis direction compression, including processing for generating the compression profile function H(z). Note that while the following explanation explains for the z direction for the purposes of simplification, conversion in the x and y directions is performed at a compression rate of 1, for example.

Figure 5A:
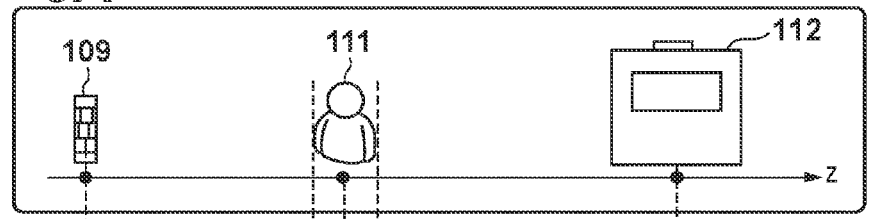
FIGS. 5A to 5F are views for explaining compression of a depth direction of three-dimensional data according to the first embodiment.
Figure 5B:
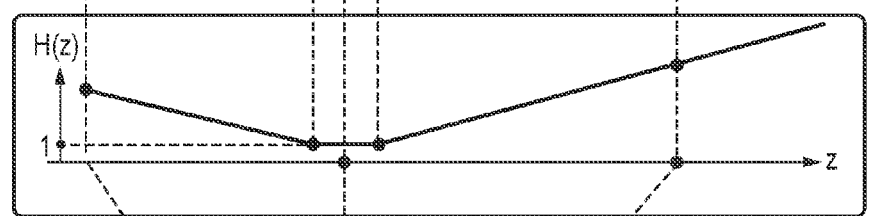
Figure 5C:
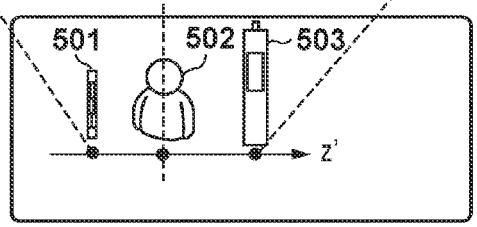

FIG. 5A schematically illustrates a positional relationship in three-dimensional data from the perspective of a direction perpendicular to the z-axis (the positive x-axis side). In addition, FIG. 5B illustrates characteristics of the compression profile function H(z); the abscissa axis illustrates depth (z) and the ordinate axis illustrates the compression rate. For example, when the compression rate is 1, a z-axis direction component is maintained unchanged. For example if the compression rate is 2, a distance in the z-axis direction is further compressed to 1/2. Regarding the object 111, because a compression rate for a portion corresponding to the position and thickness range in which the object 111 is present is 1, the position and thickness are not changed. However, regarding positions other than that of the object 111, a characteristic that the compression rate linearly increases in accordance with separation from the position is illustrated. For this reason, the positional relationships in the z-axis direction for each of the object 111, the object 109, and the object 112 are each compressed, and as illustrated in FIG. 5C, shortening is performed such as with the distances between objects 501 and 502 and between objects 502 and 503. In addition, because the thicknesses of the object 109 and the object 112 are also compressed, each is respectively compressed to the thicknesses of the objects 501 and 503 illustrated in FIG. 5C. In this way, based on the thickness and the position in the z-axis direction of the main physical object, the control unit 206 generates the compression profile function so that the compression rate with respect to the main physical object is held low and the compression rate linearly increases in accordance with a distance from the main physical object (in other words, increases monotonically).

In step S306, the control unit 206 generates, from the compression profile function, a conversion function G(z) for actually converting the z-axis data of the three-dimensional data. If expressed as an equation of a continuous system, the conversion function G(z) can be generated from the compression profile function H(z) in accordance with an equation expressed by Equation 1. Equation 1 becomes the equation expressed by Equation 2 in an equation of a discrete system which is suitable for CPU computation or the like.

[EQUATION 1]

$$G(z) = \frac{1}{z}\int_0^z \frac{1}{H(z)}\,dz \qquad \text{(eq. 1)}$$

$$G(z) = \frac{1}{z}\sum_0^z \frac{1}{H(z)} \qquad \text{(eq. 2)}$$

$$z' = z \cdot G(z) \qquad \text{(eq. 3)}$$

Figure 5D:
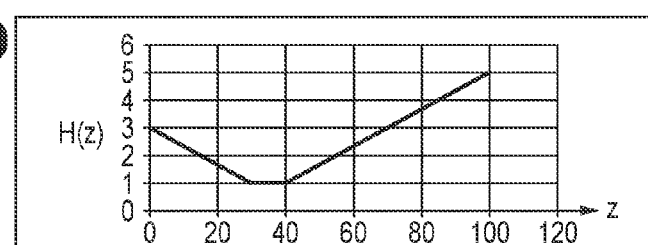
Figure 5E:
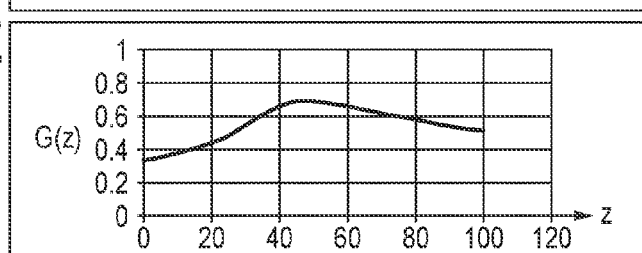
Figure 5F:
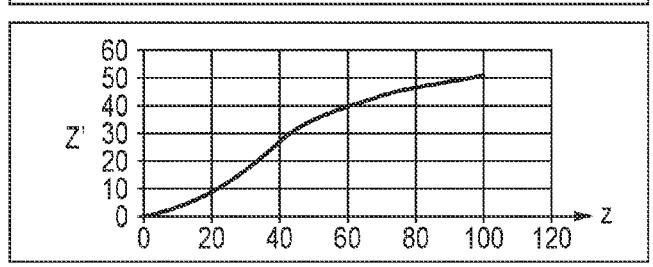

Regarding the compression profile function H(z) in the z-axis direction, the conversion function G(z) and a post-conversion z', explanation is given with reference to FIG. 5C. To simplify the explanation, the abscissa axis z is normalized to 0 to 100. A position of z=0 is equivalent to a frontmost surface position of the range of data in the z-axis direction, and a position of z=100 is equivalent to a final position of the range of data in the z-axis direction. FIG. 5D represents the compression profile function H(z), with which the compression rate, aside from the range of the main physical object (z=30 to z=40), can be set to any value. For the compression rate for other than the range of the main physical object, for example configuration may be taken so as to set the compression rate of the frontmost surface position and the final position in the z-axis direction to respectively predetermined compression rates, and then calculate from a relation to the position and thickness of the main physical object. The conversion function G(z) illustrated in FIG. 5E is a function calculated by applying Equation 1 and Equation 2 to the compression profile function H(z) illustrated in FIG. 5D. If a coordinate before being compression converted as is set as z, and the coordinate corresponding to z after the conversion is set as z', the relation between z and z' is represented by Equation 3. Graphing the relation between z and z' gives FIG. 5F.

In step S307, the control unit 206 uses the conversion function G(z) in the z-axis direction determined in step S306 to perform processing to convert the data in the z-axis direction for the three-dimensional data obtained in step S302. FIG. 6 illustrates syntax of the STL (STereoLithography) file format, which is an example of a file format for three-dimensional data. As illustrated in FIG. 6, the three-dimensional data is expressed in a format that lists polygon information that is triangle information in a three-dimensional space. More specifically, a "facet normal" line to an "endfacet" line comprises detailed data for the triangle data, and the detailed data is described in the "facet normal" line and "vertex" lines. The "facet normal" lines express a normal vector of a triangle, and the three "vertex" lines express coordinates of each vertex of the triangle data and also hold numerical values for x, y, and z components of each vertex. Accordingly, the control unit 206 applies the conversion function G(z) to the information of each vertex of the triangle, and converts the positions in the z-axis direction.

Figure 7A:
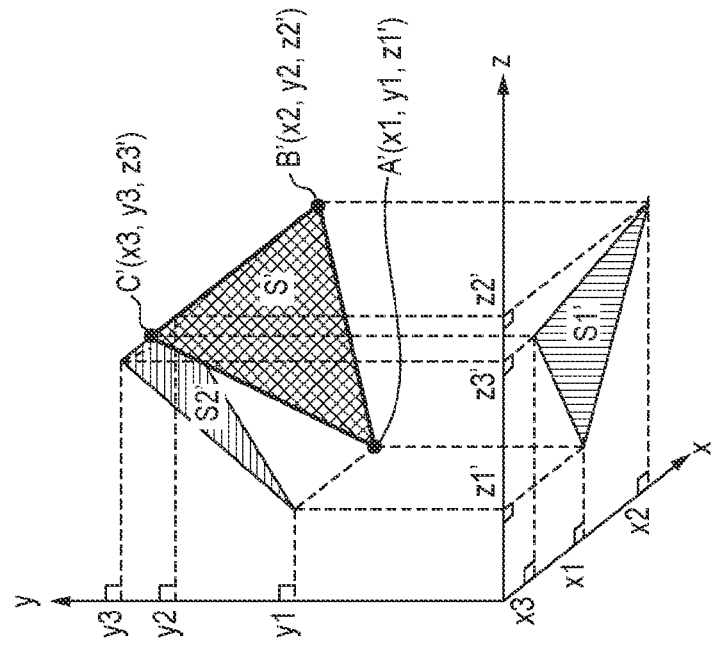
FIGS. 7A and 7B are views for explaining compression of a depth direction of three-dimensional data according to polygon information according to the first embodiment.
Figure 7B:
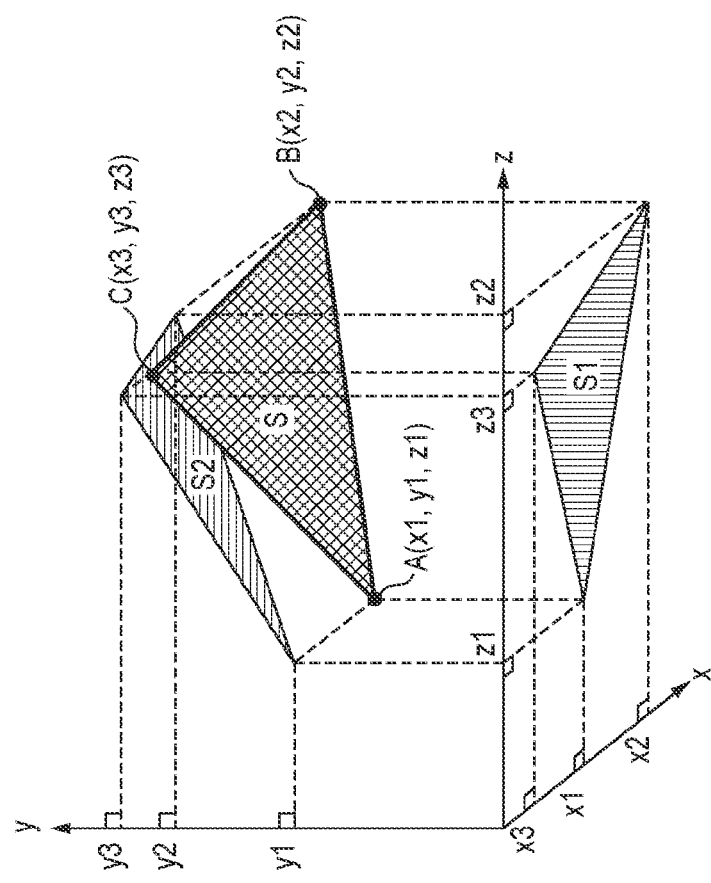

FIG. 7A and FIG. 7B illustrate how the z-axis conversion function G(z) is used to convert the polygon triangle information in the z-axis direction. In FIG. 7A, polygon information denoted by S is comprised by three vertexes: A(x1, y1, z1), B(x2, y2, z2), and C(x3, y3, z3). With respect to all polygon information included in the three-dimensional data and without changing x components and y components, the control unit 206 calculates the z' indicated by Equation 3 with respect to only the z components, and generates data in which z is changed to z'. FIG. 7B illustrates polygon information in which S illustrated by FIG. 7A becomes S' after only z components are compressed by Equation 3. Each piece of vertex information A to C that comprises S is respectively converted to A'(x1, y1, z1'), B'(x2, y2, z2'), and C'(x3, y3, z3').

When conversion processing completes for all the polygon information, the control unit 206 causes the converted polygon data listed in the STL format to be stored in the memory card 210 via the memory slot 209. Upon causing the converted three-dimensional data to be stored, the control unit 206 terminates the series of operations corresponding to the conversion processing of the three-dimensional data.

Note that, in the present embodiment, with respect to the three-dimensional data obtained by the three-dimensional scan in step S301, configuration is taken so as to, after reducing the x, y, and z directions by the same reduction in advance, further perform the conversion processing with respect to the z-axis direction. However, configuration may be taken to apply a reduction other than that for the x-axis and y-axis directions to the z-axis direction—in other words to apply the reduction obtained on the basis of the compression profile function—without performing reducing in advance in accordance with the same reduction in step S301. In such a case, if the compression profile function H(z) is set as a function that represents a reduction with respect to a real physical object, it is possible to implement the processing of the present embodiment.

Figure 8A:
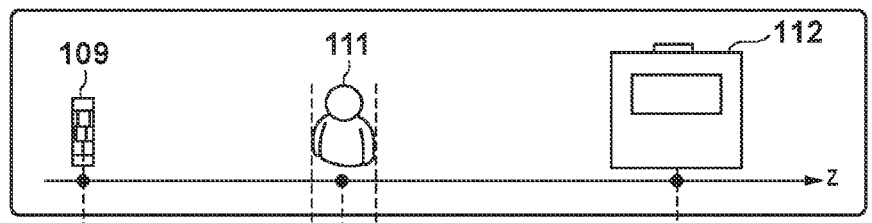
FIGS. 8A to 8F are views for explaining compression of a depth direction of three-dimensional data as a variation according to the first embodiment.
Figure 8B:
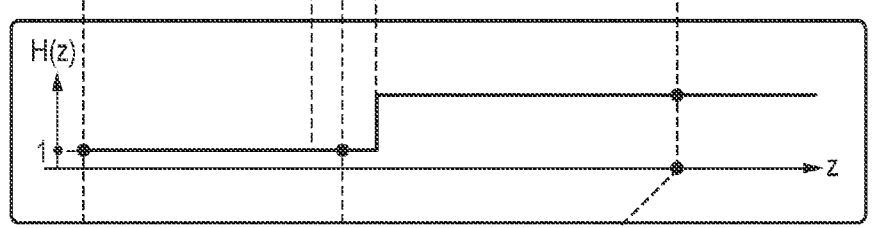
Figure 8C:
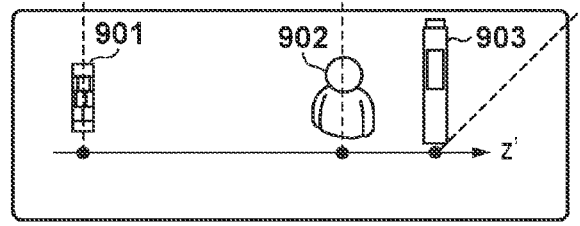
Figure 8D:
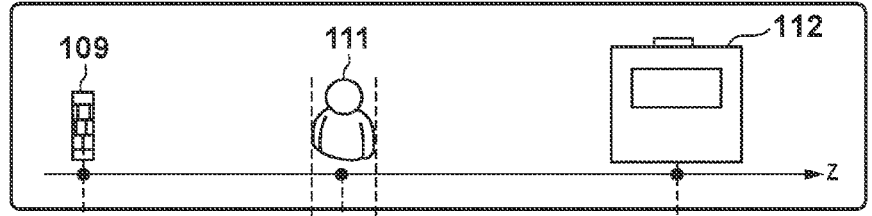
Figure 8E:
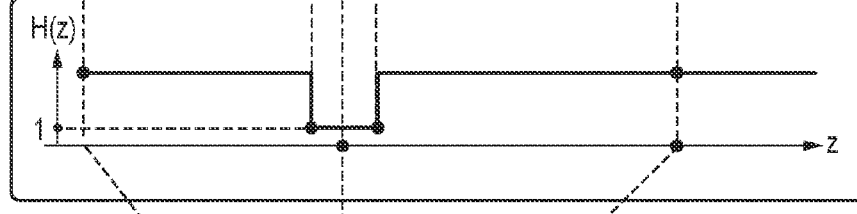
Figure 8F:
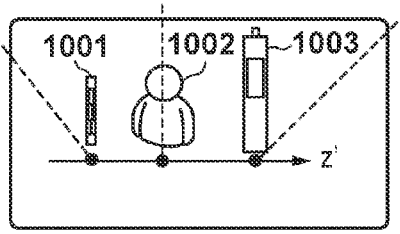

In addition, in the present embodiment, in the compression profile function H(z), in a region other than the main physical object, configuration is taken so that the depth direction of the three-dimensional data is converted by causing the compression rate to change linearly. However, characteristics of the compression profile function H(z) can be set to various characteristics in accordance with an intention of a user or a feature of a physical object. For example, a variation of H(z) is illustrated in FIG. 8A to FIG. 8C. While FIG. 8A is the same as the above described FIG. 5A, FIG. 8B illustrates characteristics of a compression profile function H(z) that determines by how much the distance in the z-axis direction of the three-dimensional data illustrated in FIG. 8A is compressed. In the H(z) illustrated in FIG. 8B, configuration may be taken to raise the compression rate all at once in a stepped shape from an end position on the z-axis for the main physical object. With such a configuration, as illustrated in FIG. 8C, while maintaining a positional relationship between an object 901 and an object 902 (the main physical object) after the converting, it is possible to achieve a configuration in which a positional relationship and a depth for an object 903 that is on a far side of the main physical object are significantly reduced. For example, another variation is illustrated in FIG. 8D to FIG. 8F. FIG. 8D is similar to FIG. 8A, but for FIG. 8E configuration is taken to furthermore raise and lower the compression rate all at once in a stepped shape before and after the start position and the end position on the z-axis of the main physical object in the compression profile function H(z) illustrated in FIG. 5B. If such a configuration is taken, the positional relationship and the depth are reduced at equal rates before and after the object 1002 (the main physical object), while maintaining the thickness of the main physical object after the converting. In such a case, it is possible to emphasize the main physical object while aligning an interval between an object 1001 and the object 1002 and an interval between the object 1002 and an object 1003 to a positional relationship for real physical objects.

As explained above, in the present embodiment, it is possible to change a reduction of data of a position in a predetermined direction, such as a z-axis direction, and additionally change the reduction (a compression rate) in accordance with the position (a range) in a z-axis direction. In other words, the compression profile function H(z) is determined with respect to the depth direction, and data for a depth direction position in the three-dimensional data is respectively converted in accordance with a position at which a physical object is present. With such a configuration, it is possible to deform three-dimensional data for causing a formed object to be output by using a reduction or an enlargement suitable to the formed object.

In addition, when changing the reduction in accordance with a position in the depth direction, configuration is taken so that the depth of the three-dimensional data is deformed in accordance with a type of a physical object, i.e. the compression rate is lowered in the depth direction for a region of the main physical object, but the compression rate is raised aside from the region of the main physical object. In other words, configuration is taken so as to respectively set the compression rate for the overall depth direction and the compression rate for the depth direction of a specific subject. With such a configuration, it is possible to emphasize and provide a presence for the main physical object with respect to other physical objects, as illustrated in FIG. 5C, and it is possible to generate an appropriate formed object for a memento physical object, an interior object, or the like.

Second Embodiment

Next, explanation will be given for a second embodiment. In the first embodiment, a compression profile function that lowers the compression rate of a selected main physical object and raises the compression rate of other regions was used to perform conversion processing of three-dimensional data. In the present embodiment, a compression profile function that lowers the compression rate for a plurality of main physical objects, i.e. for a sub main physical object aside from the main physical object, is used to perform conversion processing of three-dimensional data. For this reason, processing to determine the sub main physical object and a determined compression profile function differs from in the first embodiment, while other elements are the same as to those in the first embodiment. Accordingly, the same reference numerals are applied to the same elements and steps, duplicate explanations are omitted, and explanation is given predominantly for points of difference.

Figure 9:
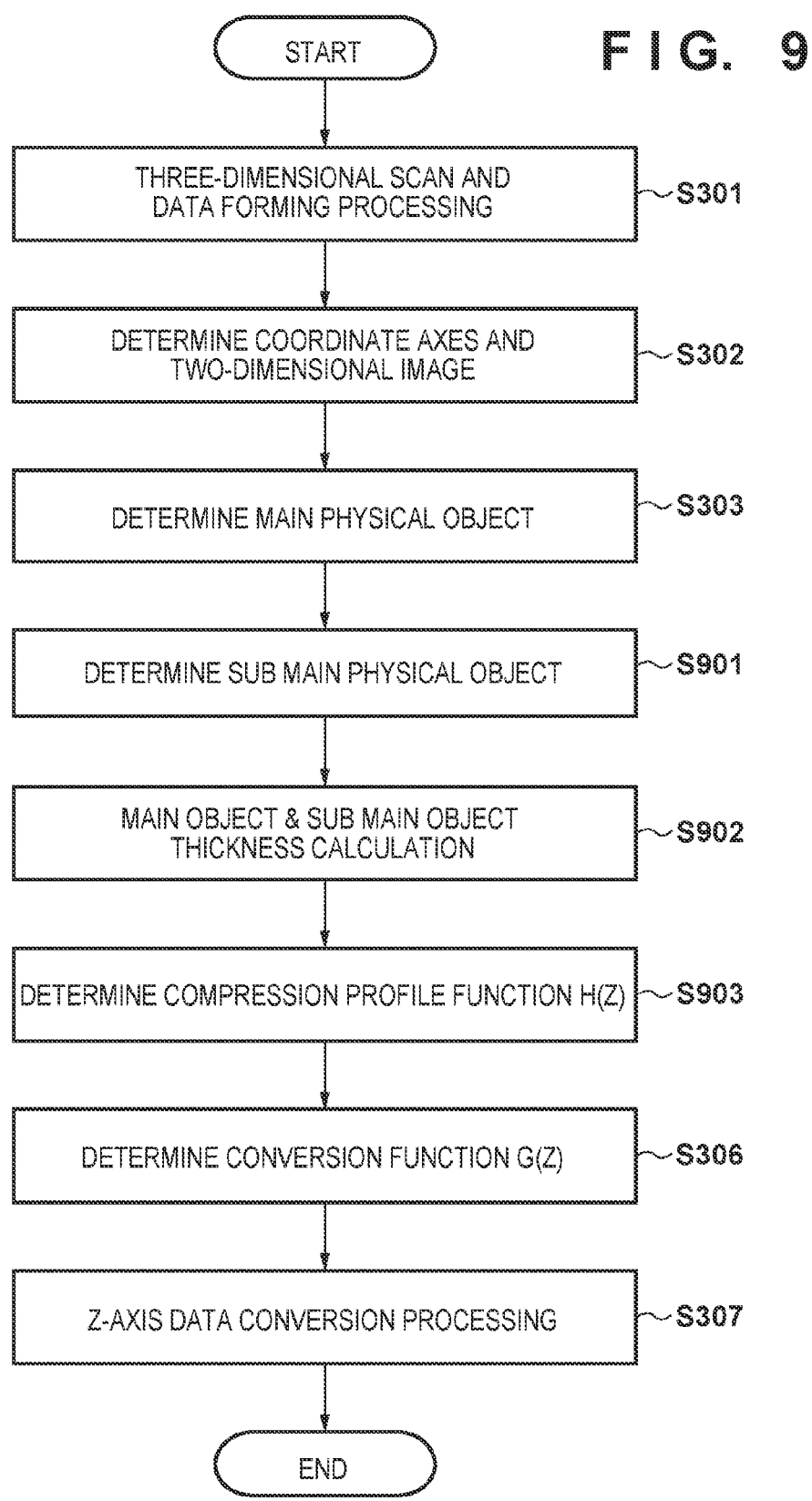
FIG. 9 is a flowchart that illustrates a series of operations of conversion processing of three-dimensional data according to the second embodiment.

Explanation is given of a flow of processing according to the present embodiment with reference to a flowchart illustrated in FIG. 9.

First the control unit 206 performs the processing of step S301 to step S303 illustrated in FIG. 3.

Next, in step S901, the control unit 206 determines a sub main physical object that has a high importance but has lower priority than the main physical object selected in step S303. As illustrated in FIG. 4A, with respect to the four physical objects in the image that are detected by the processing in step S303, i.e. the physical objects 401-404, the physical object detection frames 405-408 are for clearly showing that each has been detected are displayed. By an operation with respect to the screen operation unit 203, a user selects any physical object detection frame other than that for the main physical object selected in step S303. Upon receiving a notification of the user operation from the screen operation unit 203, the control unit 206 determines the corresponding physical object to be a sub main physical object. Here, it is assumed that in response to the user selecting the physical object detection frame 408, the control unit 206 determines the object 112 to be a sub main physical object. Note that the determination of the sub main physical object may be automatically determined by the control unit 206 and not only by manual selection by a user. In such a case, configuration may be taken to determine the sub main physical object in accordance with determining in what vicinity in the angle of view is the physical object positioned, and determining whether the physical object is a person. In addition, if necessary configuration may be taken such that a plurality of sub main physical objects are designated.

Figure 10:
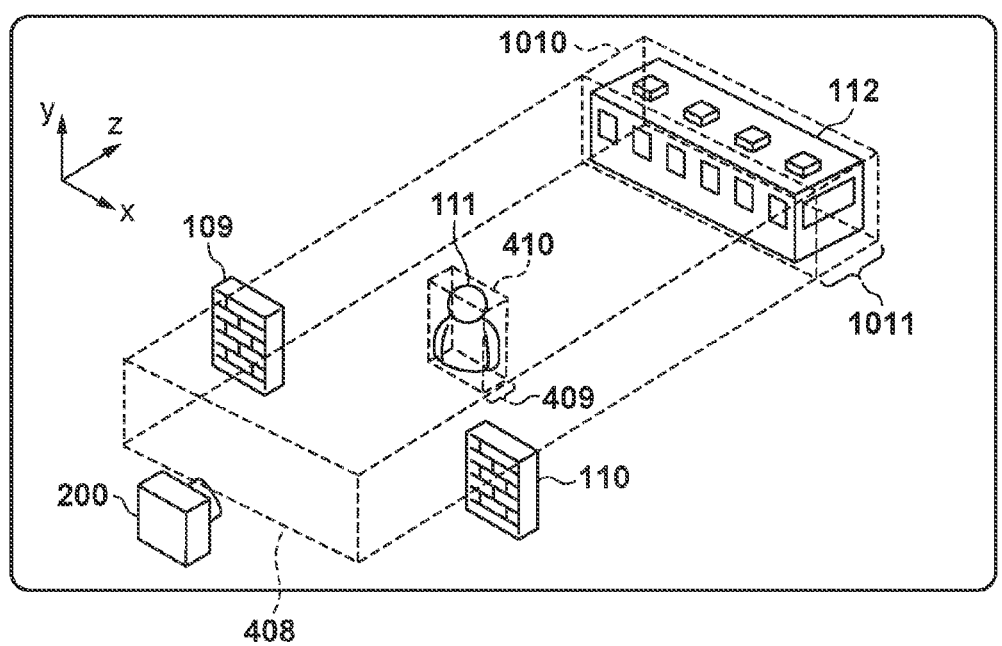
FIG. 10 is a view for explaining processing for detecting ranges of a main physical object and a sub main physical object according to the second embodiment.

In step S902, the control unit 206 calculates a thickness in the z-axis direction for each of the main physical object and the sub main physical object. Similarly to the method explained in step S305, the control unit 206 calculates the thickness for each of the main physical object and the sub main physical object. For example, as illustrated in FIG. 10, the control unit 206 scans the physical object detection frame 408 of a sub main physical object in the z-axis direction, and detects three-dimensional data included in a rectangular parallelepiped 1010 that is found by the scanning. At this point, for example if another rectangular parallelepiped such as the rectangular parallelepiped 410 is detected, configuration may be taken to select the rectangular parallelepiped for which the ratio of the area of the xy plane of the rectangular parallelepiped with that of the physical object detection frame 408 is highest.

In step S903, the control unit 206 generates the compression profile function H(z) based on the thickness and position in the z-axis direction of the main physical object and the sub main physical object calculated in step S902. According to the present embodiment, for the compression profile function H(z), explanation is given with reference to FIG. 11A to FIG. 11F.

FIG. 11A schematically illustrates a positional relationship of physical objects from the perspective of a direction perpendicular to the z-axis (the positive x-axis direction). FIG. 11B illustrates a compression profile function that determines how much to compress z-axis direction information of physical object shape data, which is similar to that of FIG. 5B. In FIG. 11B, with respect to a thickness range and position at which the main physical object is present, the compression rate is set to 1, similarly to FIG. 5B. However, for a distance corresponding to a thickness range and position at which the object 112, which is the sub main physical object, is present, the compression rate is uniformly set to 2. For other than the position and thickness regions for the object 111 and the object 112, the compression rate is set so as to linearly increase in accordance with separation from the position of the object 111.

In this way, in the present embodiment the control unit 206 generates the compression profile function H(z) so as to set the compression rate for the main physical object to be low and sets the compression rate so as to linearly increase in accordance with a distance from the main physical object, but exceptionally sets the compression rate so as to be low for the sub main physical object. With such a configuration, as illustrated in FIG. 11C, with the reduced z', in addition to the thickness of an object 1102 (the main physical object) being maintained, the thickness of an object 1103 (the sub main physical object) is maintained in the reduction. In other words, while a positional relationship between the objects 1101-1103 is reduced, the main physical object and the sub main physical object become relatively large, and the presence of these physical objects is emphasized. Because the compression rate for the sub main physical object is set to a compression rate that is different to that for the main physical object, the sub main physical object is reduced by a reduction that is slightly higher than that for the main physical object, and it is adjusted so that the main physical object is emphasized more than the sub main physical object.

Next, the control unit 206 performs the processing of step S306 and step S307 illustrated in FIG. 3, and the series of processing in accordance with this processing terminates. Note that FIG. 11E illustrates a conversion function G(z) generated by applying equation 1 and equation 2 to a compression profile function H(z) illustrated in FIG. 11D that is generated by the above-described method. FIG. 11F expresses relatedness between each z that is converted by the conversion function G(z) and z' after the converting.

Note that, in the present embodiment, regarding the compression profile function H(z), explanation was given of linearly raising the compression rate in a range other than that of the main physical object, but configuration may be taken so as to raise the compression rate in a stepped shape from end positions on the z-axis for the main physical object and the sub main physical object. In addition, configuration may be performed to automatically generate so as to raise or lower the compression rate all at once in a stepped shape before and after start positions and end positions on the z-axis for the main physical object and the sub main physical object.

In the compression profile function H(z), explanation was given of the compression rate for a range of the main physical object or the like as a predetermined value. However, configuration may be taken so that it is possible, in accordance with input to a user interface of the screen operation unit 203 or the like, to set or change the reduction (or the compression rate) in the depth direction in accordance with a position. If such a configuration is taken, it is possible to generate a formed object that emphasizes the main physical object at a reduction more desired by a user.

As explained above, in the present embodiment, as illustrated in FIG. 11B a compression profile function that lowers the compression rate for the main physical object and the sub main physical object is used so as to perform conversion processing of the three-dimensional data. With such a configuration, it is possible to emphasize and provide a presence for not only the main physical object but also a sub main physical object, and it is possible to generate an appropriate formed object for a memento physical object, an interior object, or the like.

Third Embodiment

Next, explanation will be given for a third embodiment. In the above described embodiment, a compression profile function that lowers the compression rate for a selected plurality of main physical objects (the main physical object and the sub main physical object) and raises the compression rate for other regions is used to perform conversion processing of the three-dimensional data. In the present embodiment, in conversion processing of the three-dimensional data, processing that corrects the size of a part of a plurality of the main physical objects (for example, the sub main physical object) in the xy plane direction is also performed. For this reason, processing and configuration other than that for the size correction processing is the same as in the second embodiment. Accordingly, the same reference numerals are applied to the same elements and steps, duplicate explanations are omitted, and explanation is given predominantly for points of difference.

Firstly, regarding a relation between the size and the position of the main physical object and the sub main physical object envisioned in the present embodiment, explanation is given with reference to a part of FIG. 13A (detail of FIG. 13A is separately explained later). In the present embodiment, for a main physical object 1301 and a sub main physical object 1302, for example a case in which the actual size of the main physical object 1301 is half of the actual size of the sub main physical object 1302 is envisioned. This may be, for example, when the main physical object 1301 is a child and the sub main physical object 1302 is an adult. In addition, a distance (L1) from the digital camera 200 to the main physical object 1301 is half of a distance (L2) from the digital camera 200 to the sub main physical object 1302. In such a case, a two-dimensional image in the xy directions captured from the position of the digital camera 200 is, for example, as in FIG. 13A. Specifically, although the actual size of the main physical object 1301 is half of that of the sub main physical object 1302, they are the same size in the two-dimensional image. Hypothetically if a formed object in the final three-dimensional shape is output at this ratio, because viewing of this formed object is not limited to being from the direction and position illustrated in FIG. 13A, there is a possibility that the relationship of the sizes becomes unnatural. For this reason, in the present embodiment, based on the size in the xy plane direction of the main physical object, the size in the xy plane direction of the sub main physical object is normalized (i.e. corrected) Below, in the present embodiment, explanation is given of an example of correction processing for generating a formed object that more appropriately reflects the sizes of an adult and a child.

(Series of Operations Corresponding to Three-Dimensional Data Conversion Processing)

Figure 12:
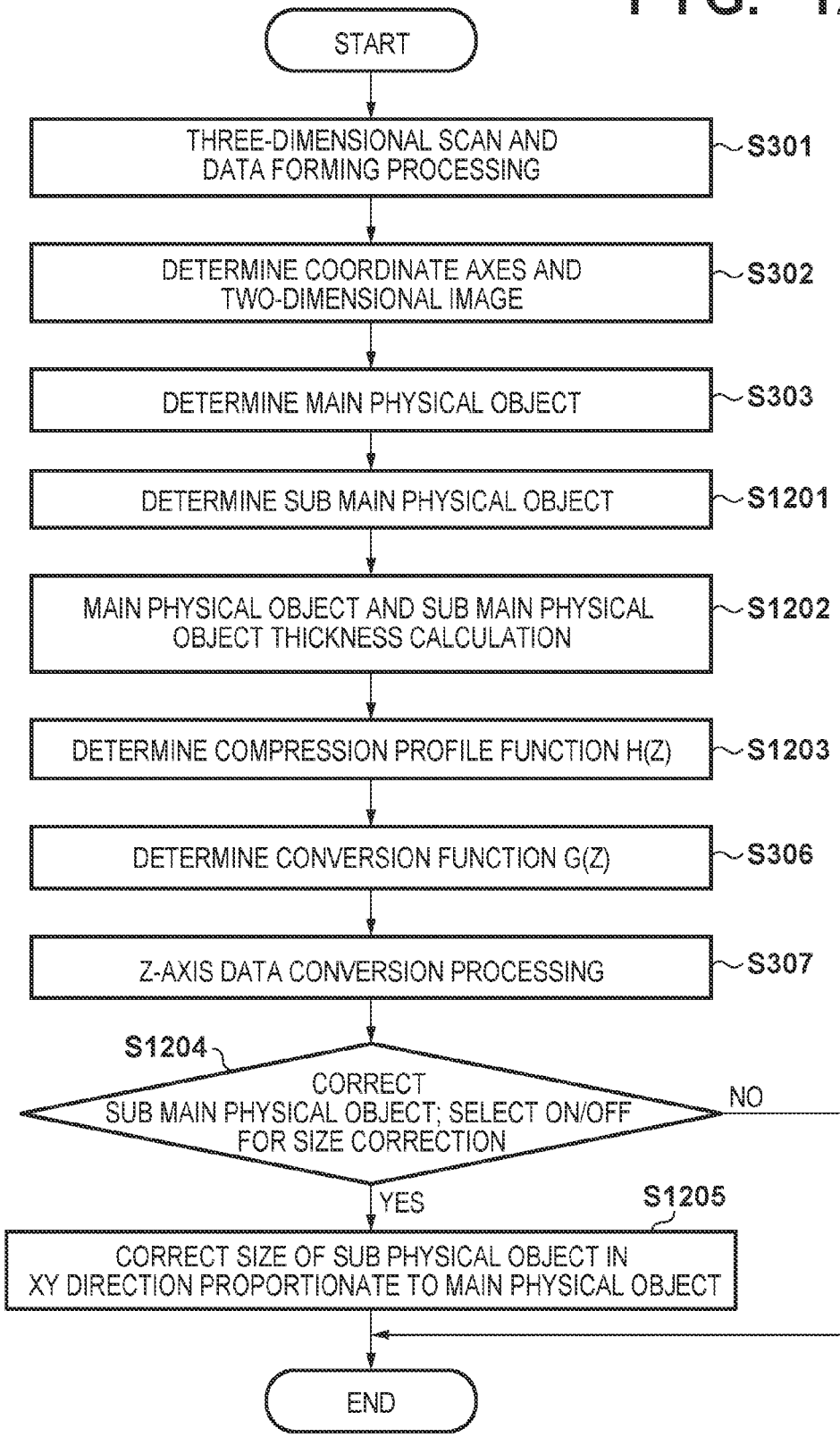
FIG. 12 is a flowchart that illustrates a series of operations of conversion processing of three-dimensional data according to a third embodiment.

Next, explanation is given regarding the series of operations of the conversion processing of the three-dimensional data according to the present embodiment, with reference to a flowchart illustrated in FIG. 12.

First the control unit 206 performs the processing of step S301 to step S303 illustrated in FIG. 3 or FIG. 9.

Next, in step S1201, the control unit 206 identifies a sub main physical object that has a high importance but has a priority that falls below that of the main subject selected in step S303. Processing according to this step is similar to the processing of the above described step S901, but will be explained again with reference to FIG. 13A. In the two-dimensional image selected in step S302, two physical objects (reference numerals 1301 and 1302) that are detected in step S303, and physical object detection frames 1303 and 1304 that explicitly indicate that each physical object has been detected are displayed. At this point, when a physical object detection frame with respect to something other than the main physical object selected in step S303 is selected in accordance with an operation to the screen display unit 202 by a user, the control unit 206 determines a physical object corresponding to the selected physical object detection frame as the sub main physical object. For example, if the user selects a physical object detection frame 1304, the sub main physical object 1302 is determined as the sub main physical object.

In step S1202, the control unit 206 calculates a thickness in the z-axis direction for each of the main physical object and the sub main physical object. Similarly to the method illustrated in step S305, the control unit 206 calculates each of the thicknesses in the z-axis direction. For example, as illustrated in FIG. 13B, the control unit 206 scans the physical object detection frame 1303 corresponding to the main physical object 1301 (an object 1307) and the physical object detection frame 1304 corresponding to the sub main physical object 1302 (an object 1308) in the z-axis direction. Three-dimensional data included in rectangular parallelepipeds 1309 and 1310 formed by the scanning is detected, and thicknesses 1305 and 1306 of the objects are detected.

In step S1203, the control unit 206 generates the compression profile function H(z) based on the positions and thicknesses in the z-axis direction calculated for the object 1307 and the object 1308 in step S1202. According to the present embodiment, for the compression profile function H(z), explanation is given as appropriate with reference to FIG. 14A, FIG. 14B, and FIG. 14D to FIG. 14F.

FIG. 14A schematically illustrates a positional relationship of physical objects from the perspective of a direction perpendicular to the z-axis (the positive x-axis direction). Similarly to the compression profile functions in the above described embodiments, FIG. 14B illustrates a compression profile function that determines by how much to compress z-axis direction information of physical object shape data. In FIG. 14B, with respect to a thickness range and position at which the object 1307 which is the main physical object is present, the compression rate is set to 1, similarly to FIG. 11B. However, for a distance corresponding to a thickness range and position at which the object 1308, which is the sub main physical object, is present, the compression rate is uniformly set to 2. For other than the position and thickness regions for the object 1307 and the object 1308, the compression rate is set so as to linearly increase in accordance with separation from the position of the object 1307.

In this way, in the present embodiment the control unit 206 generates the compression profile function H(z) so as to set the compression rate for the main physical object to be low and sets the compression rate so as to linearly increase in accordance with a distance from the main physical object, but exceptionally sets the compression rate so as to be low for the sub main physical object. With such a configuration, with the reduced z', in addition to the thickness of the object 1307 (the main physical object) being maintained, the thickness of the object 1308 (the sub main physical object) is maintained in the reduction.

Next, the control unit 206 performs the processing of step S306 and step S307 illustrated in FIG. 3. Note that FIG. 14E illustrates a conversion function G(z) generated by applying equation 1 and equation 2 to a compression profile function H(z) illustrated in FIG. 14D that is generated by the above-described method. FIG. 11F expresses relatedness between each z that is converted by the conversion function G(z) and z' after the converting.

Furthermore, in step S1204 and step S1205, the control unit 206 corrects the size of the sub main physical object in the xy plane direction with respect to the main physical object.

Firstly, in step S1204 the control unit 206 obtains a setting by a user that selects whether to correct the size of the object 1308 (the sub main physical object) in the xy plane direction. For example, this setting selects whether to correct the size of the object 1308 (the sub main physical object) in the xy plane direction in accordance with the size of the object 1307 (the main physical object). If the obtained setting is a setting for performing correction, the control unit 206 advances the processing to step S1205, and if the setting is to not perform correction, the control unit 206 terminates the series of operations according to this processing without performing correction.

Figure 15:
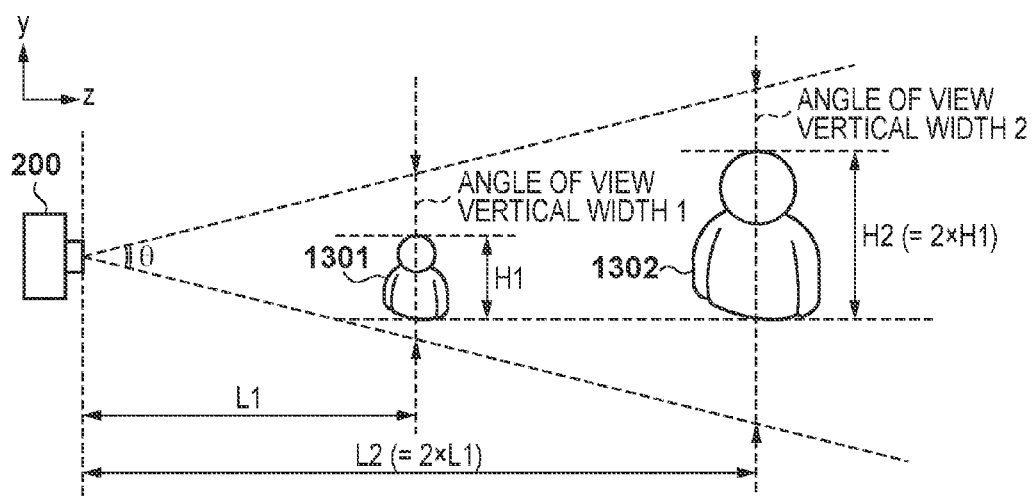
FIG. 15 is a view for explaining correction processing of a magnitude of a depth direction and a vertical plane direction according to the third embodiment.

In step S1205, the control unit 206 corrects the size of the object 1308 (the sub main physical object). More specifically, the control unit 206 calculates parameters to correct the size of objects by using a ratio of distances to each object. For example, FIG. 15 illustrates a schematic diagram of a yz plane of FIG. 13B from the perspective of the x-axis direction. For example, assume that a distance from the digital camera 200 to the main physical object 1301 is L1, and a distance from the digital camera 200 to the sub main physical object 1302 is L2, and there is a relation that L2=L1×2. It is assumed that the length of the main physical object 1301 in the y direction is H1, the length of the sub main physical object 1302 in the y direction is H2, and there is a relationship that H2=H1×2. Furthermore, the angle of view of the digital camera 200 is assumed to be θ. At this point, assuming that a vertical width corresponding to a range of the angle of view at the distance L1 is an angle of view vertical width 1, and a vertical width corresponding to a range of the angle of view at the distance L2 is an angle of view vertical width 2, the angle of view vertical width 2 is twice the angle of view vertical width 1 by an analogous relation. Accordingly, if captured from an image capture position, the size of each object in the two-dimensional image is inversely proportional to the distance to the respective physical object. Specifically, the control unit 206 uses the ratio of L2/L1 to correct (specifically, magnify/reduce) the size in the x-direction and the y direction of the three-dimensional data information of the object 1308 (the sub main physical object), and then converts the sub main physical object data of an object 1402. For example, FIG. 14C illustrates an object 1401 and the object 1402, which are results of performing correction on the size of the object 1308.

With such a configuration, it is possible to have a size relationship in which the size in the xy plane direction of the object 1401 after converting and the object 1402 after converting better corresponds to reality. Similarly to the second embodiment, the sub main physical object data of the object 1402 has a shape in which thickness is held and emphasized in comparison to an object after converting in accordance with the method of the first embodiment (for example, reference numeral 503).

Upon generating the sub main physical object data of the object 1402, the control unit 206 terminates the series of operations in accordance with this processing.

Note that, in above-described step S1204, explanation was given for an example in which setting was performed that selected whether to perform correction of the size of the sub main physical object. Making whether to perform correction selectable in this way is because there may be cases in which setting correction to OFF is more appropriate. For example, in an example illustrated by FIG. 16A and FIG. 16B, it is illustrated that a main physical object 2001 and a sub main physical object 2002 are captured as subjects in a two-dimensional image, and correspond to three-dimensional forms of an object 2003 (the main physical object) and an object 2004 (the sub main physical object).

Figure 16A:
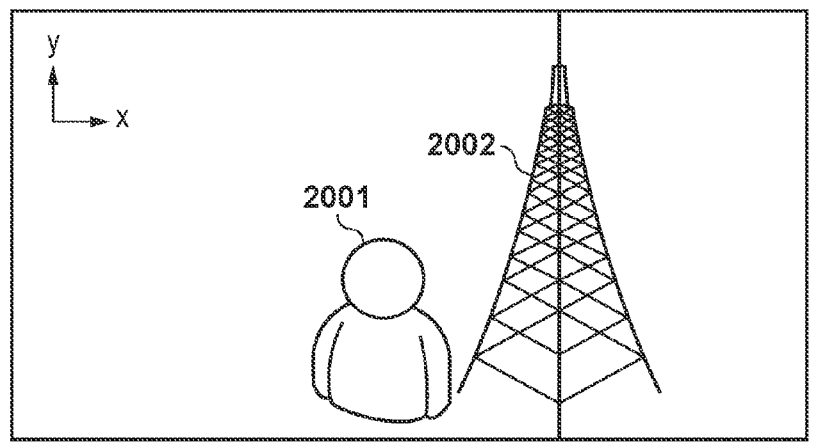
FIGS. 16A and 16B are views for explaining a method of detecting a range of a main physical object according to the third embodiment.
Figure 16B:
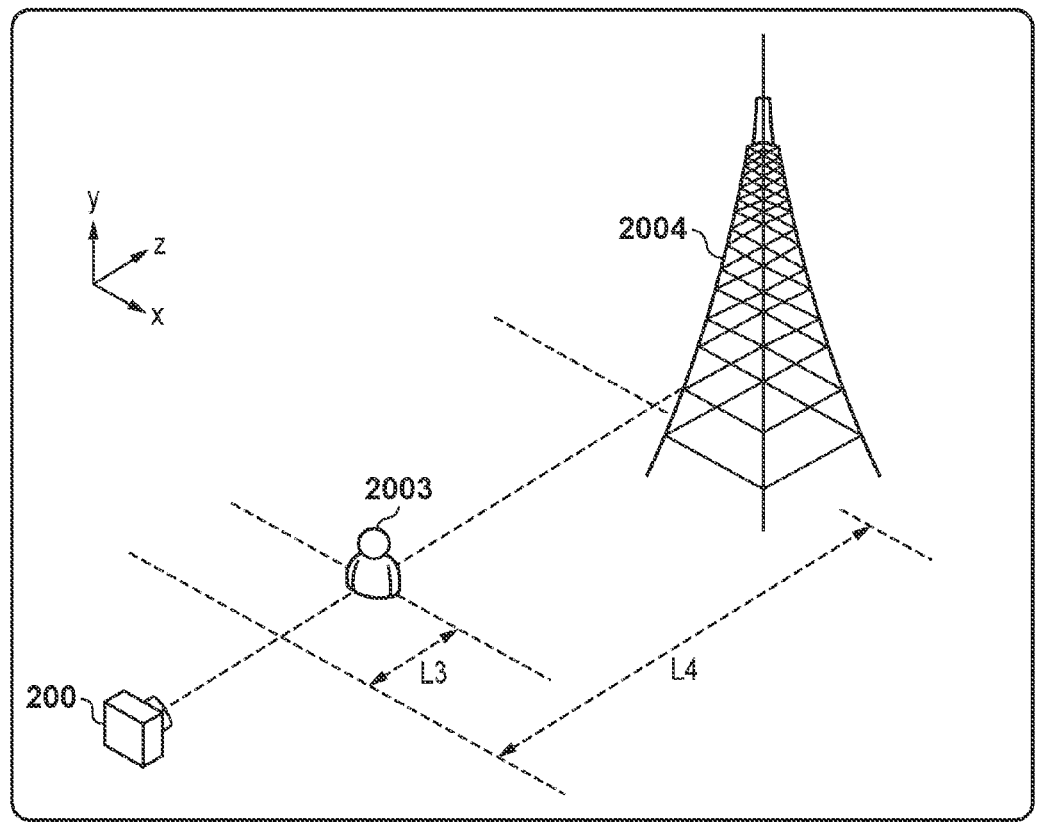

In this example, a case in which the main physical object 2001 is a person and the sub main physical object 2002 is a huge landmark such as a tower is illustrated. At this point, in comparison to a distance L3 from the digital camera 200 to the object 2003, it is assumed that a distance L4 to the object 2004 is very large. In addition, the image illustrated in FIG. 16A has a composition that attempts to capture all of the sub main physical object 2002, which is a tower, along with the main physical object 2001, which is a person, for example as in a memento photograph. In such a case, if the correction processing explained in step S1205 is performed, the three-dimensional data of the sub main physical object 2002 is magnified and becomes excessively large due to the actual ratio, and it is possible that a relation of the subjects intended when capturing FIG. 16A breaks. Accordingly, when capturing as illustrated in FIG. 16A is performed, it is desirable to be able to control so as to not perform correction of the size of the sub main physical object (i.e., setting it to OFF).

In other words, by virtue of the present embodiment, in accordance with captured content, it is possible to control existence/absence of the correction processing of the size in the xy plane direction of the main physical object 1301 and the sub main physical object 1302. Even in a case where this correction processing is not performed, in a case, as illustrated in FIG. 11C, of outputting a formed object as an interior object or a memento product in a shape that emphasizes each of the main physical object and the sub main physical object and compresses portions other than these physical objects, it is possible to convert to suitable data.

Note that, in the present embodiment, explanation was given for an example in which the sub main physical object is determined by a user operation in step S1201. However, configuration may be taken so that the control unit 206 automatically determines one or more sub main physical objects based on, for example, a position in the angle of view of the sub main physical objects or a result of determining whether the physical objects are people, or the like.

In addition, in the present embodiment, explanation was given for an example in which selection of the existence/absence of the correction processing was selected by a user operation in step S1204, but configuration may be taken to automatically select the existence/absence of the correction processing, for example, independently of the user operation based on a recognition result such as recognition of the type of the physical object or a size of the physical object. For example, the control unit 206 may be configured to set the correction processing to OFF if a difference between the size of the main physical object and the sub main physical object is greater than a predetermined threshold. Also, for example, the control unit 206 may be configured to set the correction processing to ON if the main physical object and the sub main physical object are both determined to be people.

As explained above, in the present embodiment, configuration was taken so as to correct the size in the xy plane direction of the sub main physical object based on the ratio between the distances in the depth direction of the main physical object and the sub main physical object. By configuring in this way, for three-dimensional shape data for causing the outputting of the formed object, it is possible to convert the size in directions perpendicular to the depth direction (the xy plane direction) to be a size relationship that better fits reality, and then output. In addition, configuration was taken so that whether to perform this correction was made to be settable, and if, in particular, the ratio of the distances in the depth direction of the main physical object and the sub main physical object is not an appropriate relation, the correction is not performed. With such a configuration, it is possible to deform three-dimensional shape data for causing a formed object to be output by using a reduction or an enlargement suitable to the formed object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-253414, filed Dec. 15, 2014, and No. 2015-187438, filed Sep. 24, 2015, which are hereby incorporated by reference herein in their entirety.

What is claimed is:

1. An image processing apparatus comprising:
one or more processors; and
a memory storing instructions which, when the instructions are executed by the one or more processors, cause the image processing apparatus to function as:
an obtaining unit configured to obtain three-dimensional data that describes a space that includes physical objects;
a converting unit configured to convert data of positions in a predetermined direction of the three-dimensional data in accordance with a position of each of the physical objects, wherein the positions do not include the position of at least one of the physical objects; and
an output unit configured to output three-dimensional data converted by the converting unit,
wherein the converting unit converts data of a position in a range corresponding to a space in which the physical objects are not present with a larger compression rate compared to data of a position in a range corresponding to a space in which the physical objects are present.

2. The apparatus according to claim 1, wherein the converting unit converts data of the positions in the predetermined direction on the basis of a type of each of the physical objects present in the three-dimensional data.

3. The apparatus according to claim 1, wherein the converting unit compared to data of a position in a range for which a distance from a position corresponding to a space in which a physical object out of the physical objects which is made to be a reference is present is a first distance, converts data of a position in a range which is a second distance that is longer than the first distance at a larger compression rate.

4. The apparatus according to claim 3, wherein the converting unit compresses data of a position so that a compression rate increases monotonically in accordance with a distance from the position corresponding to the space in which the physical object which is made to be the reference is present.

5. The apparatus according to claim 1, further comprising a first input unit into which an operation of a user for a compression rate of data of a position in the predetermined direction is input,
wherein the converting unit converts data of a position in the predetermined direction of the three-dimensional data on the basis of the operation input into the first input unit.

6. The apparatus according to claim 1, wherein the converting unit magnifies or reduces, in a direction perpendicular to the predetermined direction, data of a position in a range corresponding to a space in which a predetermined physical object of the physical objects is present, based on a ratio of distances from a predetermined position to each of two physical objects that include the predetermined physical object.

7. The apparatus according to claim 6, further comprising a determination unit configured to determine whether to magnify or reduce in the direction perpendicular to the predetermined direction,
wherein the determination unit comprises a second input unit configured to obtain a user operation that selects whether to magnify or reduce in the direction perpendicular to the predetermined direction, or a determination unit configured to determine whether to magnify or reduce in the direction perpendicular to the predetermined direction on the basis of a type of the predetermined physical object, and
wherein the converting unit, if it has been determined by the determination unit to magnify or reduce in the direction perpendicular to the predetermined direction, magnifies or reduces, in the direction perpendicular to the predetermined direction, data of a position in a range corresponding to a space in which the predetermined physical object of the physical objects is present.

8. The apparatus according to claim 1, wherein
the three-dimensional data comprises two-dimensional image data obtained from an image sensor having photoelectric conversion elements arranged in two-dimensions, and, as the data of positions in the predetermined direction, data of a depth direction of a subject.

9. The apparatus according to claim 8, further comprising a detection unit configured to detect a specific physical object from the image data,
wherein the converting unit determines a physical object present in the three-dimensional data based on a result of detection by the detection unit.

10. The apparatus according to claim 9, wherein
the converting unit estimates a range in the predetermined direction of the three-dimensional data in which the physical object detected from the image data by the detection unit is present, based on of thickness information, which is stored in advance, of the physical object detected by the detection unit.

11. The apparatus according to claim 8, wherein
the image sensor receives respective light flux, which passes one of a plurality of different pupil regions of an imaging optical system, by a plurality of the photoelectric conversion elements, and
wherein data of positions in the predetermined direction of the three-dimensional data is calculated from a pair of image signals corresponding to the different pupil regions.

12. The apparatus according to claim 1, wherein
the output unit converts three-dimensional data converted by the converting unit into a predetermined format to be used in generation of a three-dimensional formed object, and outputs the result of conversion.

13. The apparatus according to claim 1, wherein
the output unit converts the three-dimensional data into an STL file format, and outputs the result of conversion.

14. A method of controlling an image processing apparatus that comprises one or more processors and a memory, the memory storing instructions which, when the instructions are executed by the one or more processors, execute the method comprising:
obtaining three-dimensional data that describes a space that includes physical objects;
converting data of positions in a predetermined direction of the three-dimensional data in accordance with a position of each of the physical objects, wherein the positions do not include the position of at least one of the physical objects; and
outputting three-dimensional data converted in the converting step,
wherein the converting the data of positions in a predetermined direction of the three-dimensional data in accordance with a position of each of the physical objects comprises converting data of a position in a range corresponding to a space in which the physical objects are not present with a larger compression rate compared to data of a position in a range corresponding to a space in which the physical objects are present.

15. A non-transitory computer-readable storage medium storing instructions which, when the instructions are executed by one or more processors of an image processing apparatus, execute a method of controlling the image processing apparatus comprising:
obtaining three-dimensional data that describes a space that includes physical objects;
converting data of positions in a predetermined direction of the three-dimensional data in accordance with a position of each of the physical objects, wherein the positions do not include the position of at least one of the physical objects; and
outputting three-dimensional data converted in the converting step,
wherein the converting the data of positions in a predetermined direction of the three-dimensional data in accordance with a position of each of the physical objects comprises converting data of a position in a range corresponding to a space in which the physical objects are not present with a larger compression rate compared to data of a position in a range corresponding to a space in which the physical objects are present.

16. An image processing apparatus comprising:
one or more processors; and
a memory storing instructions which, when the instructions are executed by the one or more processors, cause the image processing apparatus to function as:
an obtaining unit configured to obtain three-dimensional data that describes a space that includes physical objects;
a converting unit configured to convert data of positions in a predetermined direction of the three-dimensional data in accordance with a position of each of the physical objects, wherein the positions do not include the position of at least one of the physical objects; and
an output unit configured to output three-dimensional data converted by the converting unit,
wherein the converting unit compared to data of a position in a range for which a distance from a position corresponding to a space in which a physical object out of the physical objects which is made to be a reference is present is a first distance, converts data of a position in a range which is a second distance that is longer than the first distance at a larger compression rate, and
wherein the converting unit compresses data of a position so that a compression rate increases monotonically in accordance with a distance from the position corresponding to the space in which the physical object which is made to be the reference is present.

17. A method of controlling an image processing apparatus that comprises one or more processors and a memory, the memory storing instructions which, when the instructions are executed by the one or more processors, execute the method comprising:
- obtaining three-dimensional data that describes a space that includes physical objects;
- converting data of positions in a predetermined direction of the three-dimensional data in accordance with a position of each of the physical objects, wherein the positions do not include the position of at least one of the physical objects; and
- outputting three-dimensional data converted in the converting,
  - wherein the converting the data of positions in a predetermined direction of the three-dimensional data in accordance with a position of each of the physical objects comprises compared to data of a position in a range for which a distance from a position corresponding to a space in which a physical object out of the physical objects which is made to be a reference is present is a first distance, converting data of a position in a range which is a second distance that is longer than the first distance at a larger compression rate, and
  - wherein data of a position is compressed so that a compression rate increases monotonically in accordance with a distance from the position corresponding to the space in which the physical object which is made to be the reference is present.

18. A non-transitory computer-readable storage medium storing instructions which, when the instructions are executed by one or more processors of an image processing apparatus, execute a method of controlling the image processing apparatus comprising:
- obtaining three-dimensional data that describes a space that includes physical objects;
- converting data of positions in a predetermined direction of the three-dimensional data in accordance with a position of each of the physical objects, wherein the positions do not include the position of at least one of the physical objects; and
- outputting three-dimensional data converted in the converting,
- wherein the converting the data of positions in a predetermined direction of the three-dimensional data in accordance with a position of each of the physical objects comprises compared to data of a position in a range for which a distance from a position corresponding to a space in which a physical object out of the physical objects which is made to be a reference is present is a first distance, converting data of a position in a range which is a second distance that is longer than the first distance at a larger compression rate, and
- wherein data of a position is compressed so that a compression rate increases monotonically in accordance with a distance from the position corresponding to the space in which the physical object which is made to be the reference is present.

* * * * *